(12) United States Patent
Niino et al.

(10) Patent No.: US 6,777,487 B2
(45) Date of Patent: Aug. 17, 2004

(54) POLYACETAL BLOCK COPOLYMER

(75) Inventors: Masahiko Niino, Sodegaura (JP);
Hideki Nakamura, Kurashiki (JP);
Sumio Komatsu, Kurashiki (JP)

(73) Assignee: Asahi Kasei Kabushiki Kaisha (JP)

( * ) Notice: Subject to any disclaimer, the term of this patent is extended or adjusted under 35 U.S.C. 154(b) by 20 days.

(21) Appl. No.: 09/821,246

(22) Filed: Mar. 29, 2001

(65) Prior Publication Data

US 2002/0016395 A1 Feb. 7, 2002

(30) Foreign Application Priority Data

Jul. 30, 1999 (JP) .......................................... 11-216654

(51) Int. Cl.$^7$ ................................................. C08K 5/36
(52) U.S. Cl. .................. 524/593; 524/305; 524/315; 524/394; 525/92 A; 525/398; 525/399; 525/400; 525/401; 528/230
(58) Field of Search ................................ 524/593, 305, 524/315, 394; 525/92 A, 398, 399, 400, 401; 528/230

(56) References Cited

U.S. PATENT DOCUMENTS 4,535,127 A * 8/1985 Matsuzaki ................... 525/154
5,191,011 A * 3/1993 Tajima et al. ................ 524/512

FOREIGN PATENT DOCUMENTS

| JP | 60-104116 A | 6/1985 |
| JP | 4-306215 A | 10/1992 |

* cited by examiner

Primary Examiner—Edward J. Cain
(74) Attorney, Agent, or Firm—Dickstein, Shapiro, Morin & Oshinsky, LLP.

(57) ABSTRACT

The present invention relates to a polyacetal ABA type block copolymer having a liquid hydrogenated polybutadiene block hydroxyalkylated at both end having a specific monomer structure in the main chain and a polyacetal resin composition comprising the block copolymer and a specific polymer compound or an inorganic filler. The block copolymer and the resin composition can satisfy 4 characteristics necessary for materials for large-diameter gears, i.e. (1) high cycle capability (high productivity), (2) high roundness, (3) distinguished dimensional stability and (4) distinguished durability at the same time and provide useful materials for large-diameter gears having a pitch circle diameter of 60 mm or more.

19 Claims, No Drawings

POLYACETAL BLOCK COPOLYMER

TECHNICAL FIELD

The present invention relates to a polyacetal ABA type block copolymer having a shorter crystallization time, a higher roundness and distinguished long-term dimensional characteristics and durability, when molded. In addition, such block copolymer has superior compatibility with other polymer compounds and superior adhesibility to inorganic fillers. Furthermore, the present invention relates to a composition comprising such a polyacetal ABA type block copolymer, and moldings obtained from the polyacetal ABA type block copolymer or a composition comprising the polyacetal ABA type block copolmer.

BACKGROUND ART

A polyacetal resin is a material with a distinguished slidability and is used preferably as gear material. However, in reality, the conventional polyacetal resins obtained by homopolymerization of formaldehyde or copolymerization of formaldehyde, trioxane and cyclic ether often fail to produce gears of large diameters, e.g. pitch circle diameters of 60 mm or larger, which are satisfactory from the viewpoint of performances, by injection molding. That is, (1) The larger the gear diameter, the thicker the gear itself, and the cooling time is prolonged in the injection molding step. As a result, such a problem has been encountered that the injection molding cycle will be prolonged in case of other resin materials than those having a higher crystallization rate and thus the productivity will be lowered. (2) In case of the conventional polyacetal resin, the roundness of large-diameter gears produced by injection molding is not satisfactory and as a result such a problem has been encountered that in copiers or printers using such gears, power transmission accuracy will be lowered, resulting in uneven dot distances and failure of clear print/image. (3) When large-diameter gears are injection molded from the conventional polyacetal resin, the dimensions of injection molded large-diameter gears are unstable when left standing for a long time, and application of such gears to copier or printers will give rise to failure in meshing between gears at pitch points, when used for a long time (in worst cases the meshing between gears will be brought into complete failure), causing generation of uneven vibration during the revolutionary transmission and generation of dislocated print/image. (4) Furthermore, the larger the gear diameter, the more unsatisfactory the gear durability, one of resin material properties, and thus application of such gears to copiers or printers gives rise to breakage of a gear tooth (gear teeth) due to wear, rupture or fatigue of gear when used for a long time, and thus the long-term functioning of copiers or printer cannot be so far guaranteed.

Attempts have been made with polyacetal block polymers to improve the problem of the conventional polyacetal resins, as proposed, for example, in JP-A-3-21657 and JP-A-5-9363, which disclose polyacetal polymers, which are AB type block copolymers, blocked at one end by alkylene oxide as an adduct to alcohol or carboxylic acid.

JP-A-4-306215 discloses AB type and ABA type polyacetal block copolymers comprising a polyoxymethylene segment (A) and a polymethylene segment (B), obtained by polymerizing one end or both ends of the polymethylene segment with formaldehyde, trioxane or the like in the presence of a compound containing one functional group selected from the group consisting of a hydroxyl group, a carboxyl group, an amino group, an ester group and an alkoxy group. It is further disclosed that hydrogenated polybutadiene can be used as a polymethylene segment.

Furthermore, JP-A-11-51154 discloses gears made from polyacetal copolymer having a specific monomer formulation, or the polyacetal copolymer admixed with α-olefin oligomer, an inorganic filler or the like as resin materials.

However, the polyacetal copolymers disclosed in the foregoing references fail to obtain the above-mentioned characteristics necessary for the large-diameter gears.

DISCLOSURE OF THE INVENTION

An object of the present invention is to solve the foregoing problems and provide a polyacetal ABA type block copolymer and a resin composition comprising the block copolymer, which have a high crystallization rate and are capable of molding large-diameter gears with a high roundness and distinguished dimensional stability and durability.

As a result of extensive studies to solve the foregoing problems, the present inventors have found that a polyacetal ABA type block copolymer comprising a polyacetal copolymer and a specific polymer or a polyacetal resin composition comprising the ABA type block copolymer and a specific polymer compound are distinguished in the necessary characteristics required for large-diameter gears, that is, crystallization rate, roundness, dimensional stability and durability, and have established the present invention.

That is, the present invention provides:

[1] An ABA type block copolymer, which comprises polyacetal segments (A) and a hydrogenated polybutadiene segment (B) hydroxyalkylated at both ends, represented by the following formula (1):

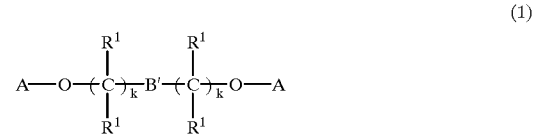

[where A comprises 95–99.9 mol % of oxymethylene units and 0.1–5 mol % of oxyalkylene units represented by the following formula (2):

(where $R^2$ is independently selected from the group consisting of hydrogen, an alkyl group, a substituted alkyl group, an aryl group and a substituted aryl group, and j is an integer selected from 2 to 6), and the terminal groups are polyacetal copolymer residues having a structure represented by the following formula (3):

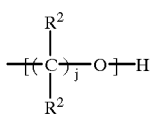
(3)

(where $R^2$ and j have the same meanings as defined above), B' is a hydrogenated polybutadiene having an iodine value of 20 g-$I_2$/100 g or less and containing 70–98 mol % of 1,2-bonds and 2–30 mol % of 1,4-bonds, $R^1$ is independently selected from the group consisting of hydrogen, an alkyl group, a substituted alkyl group, an aryl group and a substituted aryl group, and k is an integer selected from 2 to 6 where two ks may be the same or different from each other], the hydrogenated polybutadiene segment (B) hydroxyalkylated at both ends having a number average molecular weight of 500–10,000 and the ABA type block copolymer having a number average molecular weight of 10,000–500,000;

[2] An ABA block copolymer as described in the foregoing [1], wherein B' is a hydrogenated polybutadiene containing 80–95 mol % of 1,2-bonds and 5–20 mol % of 1,4-bonds;

[3] A polyacetal resin composition, which comprises 100 parts by weight of a polymer compound (I) comprising 20–100% by weight of the ABA type block copolymer as described in [1] or [2] and 0–80% by weight of a polyacetal copolymer having a number average molecular weight of 10,000–500,000, represented by the following formula (4):

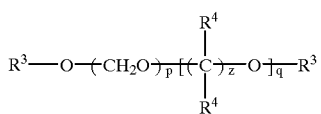
(4)

(where $R^3$ and $R^4$ are independently selected from the group consisting of hydrogen, an alkyl group, a substituted alkyl group, an aryl group and a substituted aryl group, p=95–99.9 mol %, q=0.1–5 mol %, p+q=100 mol %, and z is an integer selected from 2 to 6), and 0.1 to 200 parts by weight of at least one of polymer compounds (II) having a number average molecular weight of 500 or more, selected from the group consisting of a polyolefin-based polymer compound, a polyurethane-based polymer compound, a polyester-based polymer compound, a polystyrene-based polymer compound, a polyacryl-based polymer compound and a polyamide-based polymer compound;

[4] A polyacetal resin composition as described in the foregoing [3], wherein the polymer compound (II) is a polyolefin-based polymer compound comprising α-olefin-based polymer compound;

[5] A polyacetal resin composition, as described in the foregoing [4], wherein the α-olefin-based polymer compound comprises 0.1 to 6 parts by weight of an ethylene-α-olefin random copolymer having a number average molecular weight of 500–10,000, comprising 10–70 mol % of ethylene unit and 30–90 mol % of α-olefin unit;

[6] A polyacetal resin composition as described in the foregoing [4], wherein the α-olefin-based polymer compound is an α-olefin-based copolymer modified by an unsaturated carboxylic acid or its acid anhydride;

[7] A polyacetal resin composition as described in the foregoing [3], wherein the polymer compound (II) is a polystyrene-based polymer compound comprising a copolymer of an aromatic vinyl monomer and a copolymerizable unsaturated monomer that can be copolymerized with the aromatic vinyl monomer;

[8] A polyacetal resin composition as described in the foregoing [3], wherein the polymer compound (II) is a polystyrene-based polymer compound comprising a block (a) comprising a styrene monomer and a block (b) comprising isoprene or isoprene-butadiene and containing 20 mol % or more of vinyl bonds;

[9] A polyacetal resin composition, which comprises 100 parts by weight of a polymer compound (I) and 0.1 to 100 parts by weight of an inorganic filler;

[10] A polyacetal resin composition, which comprises 100 parts by weight of polymer compound (I), 1 to 20 parts by weight of polymer compound (II) and 0.1 to 100 parts by weight of an inorganic filler;

[11] A polyacetal resin composition, which comprises a polyacetal resin composition as described in any one of the foregoing [3] to [10], and 0.01 to 0.2 parts by weight of at least two of difatty acid calciums (calcium salt of fatty acid) having 12–22 carbon atoms and/or 0.01 to 0.9 parts by weight of at least two of esters of a fatty acid having 12–22 carbon atoms with ethylene glycol;

[12] A molding comprising an ABA type block copolymer as described in the foregoing [1] or [2], or a resin composition as described in any one of the foregoing [3] to [11];

[13] A molding as described in the foregoing [12], wherein the molding is a large-diameter gear having a pitch circle diameter of 60 mm or more; and

[14] A molding as described in the foregoing [12], wherein the molding is a large-diameter gear having a pitch circle diameter of 100 mm or more.

BEST MODES FOR CARRYING OUT THE INVENTION

ABA Type Block Copolymer

First, description will be made below of a novel ABA type block copolymer comprising polyacetal segments (A) (which may be hereinafter referred to "Segment A") and a hydrogenated polybutadiene segment (B) hydroalkylated at both ends (which may be hereinafter referred to as "Segment B").

Segment B

Segment B in the present ABA type block copolymer is a hydrogenated polybutadiene hydroxyalkylated at both ends, represented by the following formula (5):

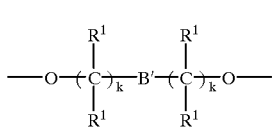
(5)

(where B' and k have the same meanings as defined before).

Segment B can be prepared according to a process comprising subjecting butadiene (above 5% or less of other vinyl monomer or conjugated diene can be used together, if necessary, from the viewpoint of productivity, etc.) to anionic polymerization in the presence of an alkali metal such as sodium, lithium, etc. or a complex of an alkali metal with an aromatic compound as a catalyst to prepare a polybutadiene; and then adding alkylene oxide to both ends of the resulting polybutadiene; followed by treatment with a protonic acid such as hydrochloric acid, sulfuric acid, acetic acid, etc. to make a prepolymer; and by hydrogenation of the prepolymer.

The butadiene polymerization process is not particularly limited, but the hydroxyalkyl groups present at both ends of Segment B play an important role in the present ABA type block copolymer, and thus it is necessary to use a polymerization process capable of adding the hydroxyalkyl groups to both ends of polybutadiene.

Preferable process for making the prepolymer includes, for example, a process comprising reacting butadiene with a Lewis base type compound and an alkali metal in advance, thereby synthesizing a dimer dianion (see JP-B-40-7051), then reacting alkylene oxide or substituted alkylene oxide with living anions present at both ends of the dimer dianion, followed by treatment with protonic acid such as hydrochloric acid, etc.

The hydroxyalkyl residues (groups) present at both ends of the prepolymer typically include hydroxyethyl residues, hydroxypropyl residues, hydroxybutyl residues, hydroxypentyl residues, hydroxyhexyl residues, and their substituted alkyl or aryl residues; among which hydroxyethyl residues are preferable.

Description will be made below of a process for hydrogenating the prepolymer. So far well-known hydrogenation processes can be used, and nickel, cobalt, ruthenium, rhodium, palladium, platinum, etc. can be used as a hydrogenation catalyst. Preferable hydrogenation process includes, for example, a hydrogenation process using alcohol and an aliphatic hydrocarbon as a reaction solvent (see JP-A-7-247302).

For the present hydrogenated polybutadiene, it is preferable that a hydrogenation rate is 100% (i.e. structure without any unsaturated bond), but so far as the iodine value is not more than 20 g-$I_2$/100 g (according to JIS K0070), the presence of unsaturated bonds in the polymer is no problem.

In the present invention, it is necessary to hydrogenate polybutadiene containing 70–98 mol % of 1,2-bonds and 2–30 mol % of 1,4-bonds, as set forth in the foregoing formula (1). The 1,2-bond content and 1,4-bond content of polybutadiene can be identified by $^1$H-NMR. The 1,2-bond content of more than 98 mol % or less than 70 mol % cannot satisfy the characteristics required for materials for large-diameter gears in the present invention. From the viewpoint of attaining more distinguished characteristics required for materials for large-diameter gears, it is preferable to use polybutadiene containing 80–95 mol % of 1,2-bonds and 5–20 mol % of 1,4-bonds. In the present invention, it is preferable to use polybutadiene with randomly distributed 1,2-bonds and 1,4-bonds.

Furthermore, it is desirable from the viewpoint of satisfying required for materials for large-diameter gears that Segment B has a number average molecular weight of 500–10,000 (in terms of polystyrene). From the viewpoint of attaining further distinguished characteristics required for materials for large-diameter gears, more preferable number average molecular weight of Segment B is 2,000–5,000 (in terms of polystyrene). Molecular weight distribution (Mw/Mn) of Segment B is preferably less than 2 from the viewpoint of characteristics required for materials for large-diameter gears.

The number average molecular weight of the Segment B can be determined by an osmotic pressure method, a terminal quantitative determination method or by GPC. For example, the number average molecular weight can be determined with a GPC (model 150C unit made by Waters, Co.) at 140° C., using 1,2,4-trichlorobenzene as a carrier and polystyrene as a standard sample.

Process for Producing ABA Type Block Copolymer

Description will be made below of a process for polymerizing the present ABA type block copolymer, using Segment B.

The present ABA type block copolymer can be obtained by copolymerizing trioxane and cyclic formal (and/or cyclic ether) in the presence of Segment B as a chain-transfer agent and further by subjecting the resulting block copolymer to a terminal stabilization treatment. During the polymerization of the block copolymer, a molecular weight-controlling agent such as water, methanol, methylal, etc. may be used besides the aforementioned monomer components.

Polymerization can be carried out under conditions as disclosed in JP-A-9-221579 and U.S. Pat. No. 5,837,781 except for the presence of the present Segment B as a chain-transfer agent.

Polymerization catalyst for copolymerizing trioxane and cyclic formal (and/or cyclic ether) is preferably a cationic active catalyst such as Lewis acids, protonic acids and their esters or anhydrides or the like. Lewis acids include, for example, halides of boric acid, tin, titanium, phosphorus, arsenic and antimony, typically, boron trifluoride, tin tetrachloride, titanium tetrachloride, phosphorus pentafluoride, phosphorus pentachloride, antimony pentafluoride and their complex compounds and salts. Specific examples of protonic acids and their esters or anhydrides include perchloric acid, trifluoromethanesulfonic acid, t-butyl perchlorate, acetyl perchlorate, trimethyloxonium hexafluorophosphate, etc., among which boron trifluoride, boron trifluoride hydrate, and coordination complex compounds of oxygen atom or sulfur atom-containing organic compounds with boron trifluoride are preferable, and preferable examples thereof typically include diethyl ether of boron trifluoride and di-n-butyl ether of boron trifluoride. The polymerization catalyst is used in an amount of $1 \times 10^{-6}$ mole—$1 \times 10^{-3}$ mole, preferably $1 \times 10^{-5}$ mole—$1 \times 10^{-4}$ mole on the basis of one mole of trioxane.

Polymerization process is not particularly limited, but a bulk polymerization process is preferable. The bulk polymerization may be carried out batchwise or continuously. The bulk polymerization process is a process for obtaining a solid massive polymer in progress of the polymerization, using monomer components in a molten state.

After the polymerization, the resulting block copolymer is put into an aqueous solution or organic solvent solution containing at least one of catalyst neutralizers/deactivators such as amines, e.g. ammonia, triethylamine, tri-n-butylamine, etc., hydroxides, inorganic acid salts, organic acid salts, etc. of alkali metals or alkaline earth metals, followed by stirring in a slurry state usually for a few minutes to a few hours, thereby deactivating the catalyst remaining in the block copolymer.

A process for deactivating the polymerization catalyst by contacting the block copolymer with vapors of ammonia, triethylamine, etc. or a process for deactivating the catalyst by contacting the block copolymer with at least one of hindered amines, triphenylphosphine, calcium hydroxide, etc. by using a mixer can be also used.

Then, the slurry following the catalyst deactivation is filtered and washed to remove the unreacted monomers, catalyst neutralizer/deactivator, and deactivated salts by catalyst neutralization, followed by drying thereby obtaining a block copolymer.

Description will be made below of a process for terminal stabilization treatment of the block copolymer following the polymerization catalyst deactivation. The polymerized block copolymer has thermally unstable hydroxypolyoxymethylene chains at both ends of the polymer, as represented by the following model structure. In the present invention, it is necessary to remove the thermally unstable hydroxypolyoxymethylene chains (unstable terminal chains) by a process involving heating the block copolymer to its melting point or higher or a process involving further contacting with a basic compound as shown below:

<u>HO—MMEMMEMM</u>—B—MMEMME
<u>MM—OH</u>→HO—EMMEMM—B—MMEMM—
OH+4HCHO (formaldehyde)

(where the underlined portions mean hydroxypolyoxymethylene chains, M means oxymethylene units, E means oxyalkylene units and B means Segment B, and the model structure only shows polymer structures before and after the removal of the hydroxypolyoxymethylene chains, and the distribution state of M and E in the model structure does not always shown the structure of the present ABA type block copolymer).

A preferable process for the terminal stabilization treatment typically comprises contacting the block copolymer melted by a biaxial extruder, etc. with a basic compound such as ammonia, triethylamine, tributylamine, etc. (together with water, if necessary), followed by kneading and removal of vapors of the contacted basic compound and generated formaldehyde.

Segment A

In this manner, the present ABA type block copolymer can be obtained by deactivation of the catalyst and removal of unstable terminal chains. The Segments A present at both ends of the ABA type block copolymer each consists of a polyacetal copolymer residue comprising oxymethylene units [i.e. $(CH_2O)$ units] originating from the trioxane subjected to the ring-opening polymerization and oxyalkylene units represented by the foregoing formula (2) originating from the cyclic formal (or cyclic ether) subjected to the ring-opening polymerization. It is preferable that the oxymethylene units and the oxyalkylene units are randomly distributed in the Segment A, i.e. polyacetal copolymer residue.

The present ABA type block copolymer has been subjected to removal of thermally unstable terminal hydroxypolyoxymethylene chains, and thus an oxyalkylene unit represented by the foregoing formula (2) is present at the end of the polyacetal copolymer residue, i.e. the end which is not bonded to the hydroxyalkylene residue (group) present at the end of Segment B. Typically, the terminal group is in a structure represented by the following formula (3):

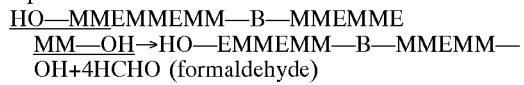

(3)

[where $R^2$ and j have the same meanings as defined in the formula (2)].

Furthermore, the polyacetal copolymer residue, i.e. Segment A, comprises 95–99.9 mol % of oxymethylene units and 0.1–5 mol % of oxyalkylene units, preferably 98–99.7 mol % of oxymethylene units and 0.3–2 mol % of oxyalkylene units.

Typical examples of the oxyalkylene unit represented by the foregoing formula (2), which originates from cyclic formal (or cyclic ether), includes an ethylene oxide residue, a propylene oxide residue, a 1,3-dioxolane residue, a 1,3,5-trioxepane residue, a diethylene glycol formal residue, a 1,4-butanediol formal residue, a 1,3-dioxane residue, etc., among which preferable oxyalkylene unit is a 1,3-dioxolane residue, a 1,3,5-trioxepane residue and a 1,4-butadiol formal residue, more preferably a 1,3-dioxolane residue, from the viewpoint of block copolymer yield.

It is particularly preferable to use a 1,3-dioxalne residue obtained by polymerizing 1,3-dioxolane having not more than 500 ppm of 2-methyl-1,3-dioxolane and not more than 15 ppm peroxide in terms of hydrogen peroxide as an oxyalkylene unit; and it is further preferable to add 10–500 ppm of one or more of hindered phenols thereto during the polymerization. The content of 2-methyl-1,3-dioxolane can be determined by a hydrogen flame ion detector based on gas chromatography, provided with Gas-chro Pack 55 made by GL Science K.K. The content of peroxide in the 1,3-dioxolane can be determined, typically, by adding 40 ml of isopropyl alcohol, 10 ml of saturated sodium iodide solution (obtained by dissolving NaI in isopropyl alcohol), 2 ml of acetic acid and 25 g of 1,3-dioxolane to a flask, followed by refluxing at 100° C. for about 5 minutes, then immediately titrating the mixture with 0.01 N sodium thiosulfate until the color of the mixture is changed from yellow to colorless in the flask to obtain a titration amount (A ml), whereas blank titration is carried out without 1,3-dioxolane in the same manner as above to obtain a blank titration amount (B ml), and calculating the content from the titration amounts thus obtained, using the following calculation equation:

Peroxide content (ppm in terms of hydrogen peroxide)=$(A-B)\times 17\times 0.01/(25\times 1000)\times 10^6$ Molecular Weight of ABA Type Block Copolymer Description will be made below of the molecular weight of ABA type block copolymer.

To satisfy the characteristics required for the present invention, the number average molecular weight of ABA type block copolymer according to the foregoing formula (1) is preferably 10,000–500,000, more preferably 20,000–200,000.

The number average molecular weight of ABA type block copolymer can be calculated by removing Segments B unreacted during the polymerization from the ABA type block copolymer, then reacting the ABA type block copolymer with acetic anhydride at a temperature of not higher than the melting point, thereby acetylating both ends of ABA type block copolymer and quantitatively determining number of acetylated terminals by an infrared absorption spectrum, or the number average molecular weight of ABA type block copolymer can be also determined by GPC.

Determination by GPC can be carried out typically in a GPC unit (model HLC-8120 made by Tosoh Corp.) with 2 columns (HFIP 806, made by Showa Denko K.K., each 30 cm high), hexafluoroisopropanol (hereinafter referred to as HFIP) as a carrier and polymethyl methacrylate (PMMA) made by Polymer Laboratories, as a standard sample, under conditions of temperature: 40° C. and flow rate: 0.5 ml/min.

Method for Identifying ABA Type Block Copolymer

Description will be made below of a method for identifying the ABA type block copolymer thus obtained.

First, description will be made of a method for quantitatively determining hydroxyalkylated, hydrogenated polybutadiene that has not undergone chain-transfer.

To quantitatively determine Segment B that has not been chain-transferred, the polymerized block copolymer is first dissolved in HFIP or a good solvent such as dimethyl formamide, etc. (in some cases heating to a temperature of not higher than the melting point of the block copolymer may be carried out for the dissolution purpose), and then water or a poor solvent such as alcohol, etc. is added thereto to reprecipitate only the polyacetal block copolymer, thereby removing Segments B that has not undergone chain-transfer, and the remaining polyacetal block copolymer is quantitatively determined.

To set more precise conditions, it is necessary to prepare Segments B and Segments A independently in advance, then prepare a sample by melting and mixing Segments B and A and confirm whether or not Segments B can be removed entirely from the sample.

Secondly, description will be made of analysis of the monomer composition, which constitutes the polymerized block copolymer.

Block copolymer freed from Segments B that has not undergone chain-transfer in the foregoing manner is hydrolyzed in an aqueous acidic solution such as hydrochloric acid, etc., whereby portions consisting of repeated oxymethylene units are changed to formaldehyde in Segments A, while portions of oxyalkylene units randomly inserted into the polyoxymethylene are changed to alkylene glycol. Segment B is returned to the Segment B before polymerization with Segments A, i.e. hydroxyalkylated, hydrogenated polybutadiene itself.

Formaldehyde and alkylene glycol can be isolated by water extraction and quantitatively determined by gas chromatography. Segment B itself can be quantitatively determined by GPC analysis or gravimetric determination of the residue from the extractive isolation of formaldehyde and alkylene glycol.

Thirdly, description will be made of a method for confirming whether the resulting block copolymer is of ABA type or of AB type.

ABA type block copolymer that is subjected to catalyst deactivation after the polymerization has thermally unstable hydroxypolyoxymethylene chains at both ends of the polymer, as already described above, and the unstable terminal chains can be removed as formaldehyde by heating, etc.

When the block copolymer is of AB type block copolymer, whose only one terminal hydroxyl group is chain-transferred among the hydroxyl groups present at both ends of Segment B, the amount of formaldehyde generated from a block copolymer having an unstable terminal chain at one end by heating, etc. must be a half of that generated from a block copolymer having unstable terminal chains at both ends.

Thus, whether the block copolymer is an AB type block copolymer or an ABA type block copolymer can be confirmed by quantitatively determining the formaldehyde generated by heating the block copolymer.

Typically, a polyacetal copolymer having an equivalent unstable terminal chain to that in case only the hydroxyl group at one end of Segment B has been chain-transferred during the polymerization is prepared by using an equimolar amount of methanol as a chain-transfer agent in phase of the present Segment B. Then, the formaldehyde generated by heating the polyacetal copolymer resulting from polymerization by chain transfer of the methanol is quantitatively determined and compared with the amount of formaldehyde generated by heating a block copolymer resulting from polymerization in the presence of Segment B. When the aldehyde generated by heating the block copolymer resulting from polymerization in the presence of Segment B is in an amount twice as large as that of the aldehyde generated by heating the block copolymer resulting from polymerization by chain transfer of the methanol, it can be confirmed that the block copolymer is an ABA type block copolymer (in view of purity of monomers, polymerization yield, etc., the amount may be twice as large within the so called experimental error accuracy range.

Polyacetal Resin Composition

The present novel ABA type block copolymer itself has a short crystallization time and such characteristics of moldings as high roundness, dimensional stability and durability. Furthermore, the present ABA type block copolymer has distinguished compatibility with other polymer compounds or adhesibility to an inorganic filler, and thus polyacetal alloying, which has been so far difficult to attain, can be realized. A polyacetal resin composition comprising the present ABA type block copolymer has distinguished repeated impact strength, and vibration controllability, etc.

Description will be made below of the present polyacetal resin composition.

The present polyacetal resin composition comprises 100 parts by weight of a polymer compound (I) comprising 20–100% by weight of the above-mentioned ABA type block copolymer and 0–80% by weight of polyacetal copolymer having a number average molecular weight of 10,000–500,000, represented by the following formula (4):

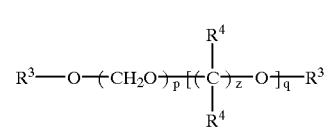

(4)

(where $R^3$ and $R^4$ are independently selected from the group consisting of hydrogen, an alkyl group, a substituted alkyl group, an aryl group and a substituted aryl group; p 95–99.9 mol %; q=0.1–5 mol %; p+q=100 mol % and z is an integer selected from 2 to 6), and 0.1 to 200 parts by weight of at least one of polymer compounds (II) having a number average molecular weight of 500 or more selected from the group consisting of a polyolefin-based polymer compound, a polyurethane-based polymer compound, a polyester-based polymer compound, a polystyrene-based polymer compound, a polyacryl-based polymer compound and a polyamide-based polymer compound.

Formula (4) does not directly show a bonding state of the oxymethylene units represented by ($CH_2O$) and the oxyalkylene units represented by [$(CR^4R^4)_zO$], and it is preferable that the oxymethylene units represented by ($CH_2O$) and the oxyalkylene units represented by [$(CR^4R^4)_zO$] are randomly distributed in the polyacetal copolymer represented by formula (4).

Furthermore, in some cases the ABA type block copolymer contains less than 20% by weight of polyacetal copolymer represented by formula (4) (i.e. containing more than 80% by weight of ABA type block copolymer) by the presence of impurities such as water, etc. at the polymerization stage, or by intentional copresence of a chain-transfer agent such as methylal, methanol, etc., but in these cases, the characteristics required for the present invention can be satisfied and thus less than 20% by weight of the polyacetal copolymer, even if contained in the ABA type block copolymer in a such cases, can be handled as an ABA type block copolymer component.

It is preferable from the viewpoint of characteristics required for the present invention that the number average molecular weight of polyacetal copolymer represented by formula (4) is 20,000–200,000.

It is preferable from the viewpoint of characteristic required for the present invention that the polymer compound (I) comprises 30–70% by weight of ABA type block copolymer and 30–70% by weight of polyacetal copolymer represented by formula (4).

Polyolefin-based Polymer Compound

Polyolefine-based polymer compound in the polymer compound (II) includes, for example, homopolymers or copolymers (random, block or graft polymers) of α-olefins such as ethylene, propylene, butene-1, pentene-1,4-methylpentene-1, hexene-1, heptene-1, octene-1, nonene-1, decene-1, undecene-1, dodecene-1, etc., copolymers (random, block or graft copolymers) of the above-mentioned α-olefins and a copolymerizable monomer, etc. The copolymerizable monomer includes, for example, conjugated dienes (butadiene, isoprene, pipelylene, etc.), non-conjugated dienes (1,4-hexadiene, dicyclopentadiene, 5-ethylidene-2-norbornene, 2,5-norbonadiene, etc.), (meth) acrylic acid or its derivatives such as esters, etc. (methyl methacrylate, etc.), (meth)acrylonitrile, aromatic vinyl monomers (styrene, α-methylstyrene, vinyltoluene, p-t-butylstyrene, etc.), vinyl ethers (vinyl methyl ether, etc.) and vinyl esters (vinyl acetate, etc.).

Modified polyolefine-based polymer compounds obtained by graft polymerizing 100 parts by weight of the polyolefin-based polymer compound with 0.01 to 10 parts by weight of unsaturated carboxylic acid (acrylic acid, methacrylic acid, maleic acid, nadic acid, etc.) or its acid anhydride can meet the object of the present invention.

Polyurethane-based Polymer Compound

Polyurethane-based polymer compound is a polymer compound having urethane bonds on the main chain and includes thermoplastic polyurethane, etc. formed by reaction of, for example, a polyisocyanate component (e.g. such polyisocyanate components as aliphatic, alicyclic, and aromatic polyisocyanates, etc.) with a polyol component (e.g. low molecular weight polyol components such as aliphatic, alicyclic and aromatic polyols, etc. or polyetherdiol, polyesterdiol, polycarbonatediol, etc.). In the preparation of polyurethane, a chain propagator (e.g. diol, diamine, etc.) may be used. Furthermore, the present polyurethane-based polymer compound also includes a polyurethane elastomer. The polyurethane-based polymer compound may be not only in a chain structure, but also in a branched chain structure, or may be cross-linked, so far as the thermoplastic property can be maintained. Among these polyurethane-based polymer compounds, polyurethane and polyurethane elastomer, etc. formed by reaction of a diisocyanate component with a diol component are preferable.

Diisocyanate component includes, for example, aliphatic diisocyanates (1,6-hexamethylene diisocyanate, etc.), alicyclic diisocyanates (isophorone diisocyanate, etc.), aromatic diisocyanates (2,4-toluene diisocyanate, 2,6-toluene diisocyanate, 4,4'-diphenylmethane diisocyanate, etc.) and so on. Diol component includes, for example, $C_2$–$C_{10}$ alkylene diols, polyoxyalkylene glycols [e.g. poly(oxyethylene) glycol, poly(oxypropylene) glycol, poly(oxytetramethylene) glycol or glycols of these copolymers (e.g. polyethylene oxidepolypropylene oxide copolymer, etc.), and so on], polyester diol, etc.

Polyester-based Polymer Compound

Polyester-based polymer compound is a copolymer compound having an ester bond on the main chain and includes, for example, polyalkylene terephthalate (e.g. poly $C_2$–$C_4$ alkylene terephthates such as polyethylene terephthalate, polybutylene terephthate, etc.), polyalkylene naphthalate (e.g. poly $C_2$–$C_4$ alkylene naphthalate such as polyethylene naphthalate, polybutylene naphthalate, etc.), copolyesters containing repeated main units of alkylene terephthalate and/or alkylene naphthalate and also containing copolymer components comprising an acid component resulting from replacement of portions of terephthalic acid and/or naphthalenedicarboxylic acid with other dicarboxylic acid, a diol component resulting from replacement of portions of alkylene glycol with other diol, etc. (The copolyester will be hereinafter referred to merely as "polyester-based copolymer"), aromatic polyesters (e.g. polyarylate, etc. formed by esterification of an aromatic diol such as bisphenol A, etc. and an aromatic dicarboxylic acid such as terephthalic acid, isophthalic acid, etc.), and so on. The present polyester-based polymer compound also includes polyester elastomers and liquid crystal polyesters.

Polyester-based copolymer can be obtained by polycondensation of an acid component comprising 99–50 mol % of terephthalic acid and/or naphthalenedicarboxylic acid and 1–50 mol % of other dicarboxylic acid than the terephthalic acid and/or naphthalenedicarboxylic acid (e.g. aliphatic dicarboxylic acid, alicyclic dicarboxylic acid and aromatic dicarboxylic acid) and a diol component [e.g. $C_2$–$C_{12}$ alkylene diols (ethylene glycol, trimethyl glycol, propylene glycol, etc.), polyoxyalkylene glycols (di(oxyethylene) glycol, di(oxypropylene) glycol, tri(oxyethylene) glycol, etc.), alicyclic glycols (1,1-cyclohexane dimethylol), 1,4-cyclohexane dimethylol, hydrogenated bisphenol A, etc.), aromatic diols (2,2-bis-(4-β-hydroxyethoxyphenyl) propane, 2,2-bis(4-β-hydroxypropoxyphenyl) propane, etc.) and so on].

Polyester elastomer includes polyester block copolymers, for example, block copolymers comprising a hard segment consisting of polyester units including low molecular weight diols and a soft segment consisting of (poly)ester units including polyether diols or aliphatic polyester diols. Preferable polyester elastomers are polyester elastomers comprising polyethylene terephthalate, polybutylene terephthalate, polybutene terephthalate or polyethylene naphthalate units as a hard segment and esters of polyoxyethylene glycol or polyoxytetramethylene glycol having a molecular weight of about 200 to about 6,000 and terephthalic acid and/or isophthalic acid as a soft segment.

Polystyrene-based Polymer Compound

Polystyrene-based polymer compound is a polymer compound obtained from one or more of aromatic vinyl monomers such as styrene, α-methylstyrene, 2,4-dimethylstyrene, p-methylstyrene, t-butylstyrene, chloromethylstyrene, ethylstyrene, etc. It is particularly preferable to use styrene as a monomer component. Furthermore, the polystyrene-based polymer compound may be copolymers of a component copolymerizable with the above-mentioned aromatic vinyl monomers. Copolymerizable component includes, for example, elastomers, etc. besides copolymerizable unsaturated monomers. Copolymerizable unsaturated monomers include, for example, (meth)acrylonitrile, (meth)acrylic acid ester, maleimide-based monomers, dienes (e.g. butadiene, isoprene, etc.), olefins (e.g. ethylene, propylene, butene, etc.), and so on. Elastomers include, for example, polybutadiene, polyisoprene, ethylene-propylene rubber, acrylic rubber, halogenopolyolefins such as chloropolystylene, etc., and so on, and may be hydrogenation products thereof. One or more each of the copolymerizable unsaturated monomers and elastomers can be used. Above all, it is preferable to use polystyrene-based elastomers consisting of a block (a) comprising an aromatic vinyl monomer and a block (b) comprising isoprene or isoprene-butadiene and having a vinyl bond content (which means the content of 3,4-bonds and 1,2-bonds in case of isoprene and the content of 1,2-bonds in case of butadiene) of 20 mol % or more, preferably 40 mol % or more (where number average molecular weight of block (a) is preferably 2,500 or more). Furthermore, it is more preferable that the block (a) comprising aromatic vinyl monomers consists of two or more of aromatic vinyl monomer components (e.g. an aba type triblock copolymer consisting of different aromatic vinyl monomer components).

Polyacryl-based Polymer Compound

Polyacryl-based polymer compound is a polymer compound comprising (meth)acrylic acid ester as repeated units. The present polyacryl-based polymer compound includes polymers obtained by copolymerization with a monomer such as vinyl compounds, diene compounds, etc., for example, acrylic acid ester, methacrylic acid ester, acrylonitrile, butadiene, ethylene chloride, styrene, etc, as long as the properties of the polymer compound are deteriorated.

Polyamide-based Polymer Compound

Polyamide-based polymer compound includes, for example, polymer compounds synthesized from a diamine component such as 2,5-dimethylhexamethylenediamine, 2,2,4-trimethylhexamethylenediamine, 3-aminomethyl-3,5, 5-trimethylcyclohexylamine, etc. and a dibasic acid such as phthalic acid, isophthalic acid, hexahydrophthalic acid, hexahydrophthalic acid, diphenic acid, naphthalenedicarboxylic acid, etc. Furthermore, block copolymers such as poly 2,5-dimethylhexamethylene isophthamide-polyethylene glycol block copolymer, poly 2,5-dimethylhexamethylene isophthamide-polytetramethylene glycol block copolymer, 2,2,4-trimethylhexamethylene naphthalenedicarbamide-polytetramethylene glycol block copolymer, etc. can be used as the present polyamide-based polymer compound.

Above all, a polyacetal resin composition more suitable for the characteristics required for the present invention can be obtained by using 0.1 to 6 parts by weight of a liquid ethylene-α-olefin random copolymer (ethylene unit: 10–70 mol % and α-olefin unit: 30–90 mol %) having a number average molecular weight of 500–10,000 as polymer compound (II). In the moldings resulting from the above-mentioned composition, no peeling phenomena are observed at all on the molding surfaces and the wear resistance of the moldings can be much more improved.

A polyacetal resin composition, which can produce moldings free from peeling thereon and distinguished in repeated impact strength, while satisfying the characteristics required for the present invention can be obtained by using 5 to 200 parts by weight, preferably 10 to 150 parts by weight, of an α-olefin copolymer obtained by modifying an α-olefin-based polymer compound with an unsaturated carboxylic acid (acrylic acid, methacrylic acid, maleic acid, nadicacid, etc.) or its acid anhydride, more preferably an α-olefin copolymer obtained by graft copolymerizing an α-olefin-based polymer compound (copolymer of ethylene and at least one of α-olefins having 3–20 carbon atoms) with 0.01 to 10 parts by weight of an unsaturated carboxylic acid (acrylic acid, methacrylic acid, maleic acid, nadic acid, etc.) or its acid anhydride as polymer compound (II). Thus, even in the gear molding, breakage of a gear tooth (gear teeth) due to collision between gears can be prevented, ensuring a longer gear life.

Furthermore, a polyacetal resin composition, which can produce moldings free from peeling thereon and distinguished in vibration controllability (particularly reduction of hammer hitting noise), while satisfying characteristics required for the present invention can be obtained by using 1 to 100 parts by weight, preferably 5 to 80 parts by weight, of a polystyrene-based polymer compound consisting of a block (a) comprising styrene monomer and a block (b) comprising isoprene or isoprene-butadiene and having a vinyl bond content (which means the content of 3,4-bonds and 1,2-bonds in case of isoprene and the content of 1,2-bonds in case of butadiene) of 20 mol % or more, preferably 40 mol % or more as polymer compound (II). Such a polyacetal resin composition has an expected use in noiseless gears.

The present ABA type block copolymer has a distinguished adhesibility to inorganic fillers such as a glass fiber and the like, and thus is free from disadvantages of inorganic filler fall-off and the like. That is, a polyacetal resin composition comprising 100 parts by weight of the above-mentioned polymer compound (I) and 1 to 100 parts by weight of an inorganic filler provides a gear material capable of improving the mechanical strength and ensuring a high load use as gears, while satisfying the characteristics required for the present invention. Gear materials obtained from such a polyacetal resin composition have an expected use as a material for gears meshing with metallic gears.

One or more of inorganic fillers can be used, and the inorganic fillers include, for example, glass fibers (average fiber diameter: 2–30 μm; 3–10 mm-long chop strands, 30–1,000 μm-long middle fibers and roving type can be particularly used), carbon fibers (average fiber diameter: 2–20 μm; 3–10 mm-long chop strands, 30–1,000 μm-long middle fibers and roving type can be particularly used), glass beads (average particle size: 5–500 μm), talc (average particle size: 5–500 μm), wollastonite (granular or acicular type having a volume average particle size of 0.5–50 μm, or both types can be used together), hydrotalcite, etc. The surface of the inorganic filler may be treated with a well known sizing agent (e.g. urethane sizing agent, olefin sizing agent, epoxy sizing agent, etc.) or a surface-treating agent (e.g. silane type, titanate type, aluminum type, zirconium type, etc.).

Furthermore, a polyacetal resin composition comprising 100 parts by weight of the above-mentioned polymer compound (I), 1 to 100 parts by weight of the above-mentioned inorganic filler and 1 to 20 parts by weight of the above-mentioned polymer compound (II), preferably a polyolefin-based polymer compound, can also meet the characteristics required for the present invention.

Description will be made below of additives, which can be further add to the present polyacetal resin composition.

A polyacetal resin composition suitable for the characteristics required for the present invention can be also obtained by adding to 100 parts by weight of the above-mentioned polymer compound (I) 0.01 to 0.2 parts by weight (sum total) of at least two difatty acid calciums (12–22 carbon atoms) and/or 0.01 to 0.9 parts by weight (sum total) of at least two difatty acid esters (12–22 carbon atoms) comprising fatty acids and ethylene glycol.

The present ABA type block copolymer or polyacetal resin composition can be admixed with other additives than the above-mentioned, when required, for example, hindered phenol-based antioxidants, hindered amine-based light stabilizers, benzotriazole-based ultraviolet ray absorbers, formaldehyde scavengers such as polyamide, melamine, melamine derivatives, poly-p-alanine copolymers, polyacrylamide, etc., pigments such as titanium oxide, carbon block, quinacridene, iron oxide, Titan Yellow, phthalocyanin, aluminum powder, etc., crystal nucleating agents such as boron nitride, etc., solid lubricants such as graphite, molybdenum disulfide, graft polyethylene, PTFE, etc., mold release agents such as ethylene bis-fatty acid amide, etc., antistatic agents such as polyethylene glycol, electroconducrtive carbon black, etc., and so on. It is particularly preferable to add to 100 parts by weight of the block copolymer or the composition 0.1 to 1.0 part by weight of triethylene glycol-bis[3-(3-t-butyl-5-methyl-4-hydroxyphenyl)propionate] as an antioxidant.

Moldings

Description will be made below of moldings prepared from the present ABA type block copolymer or polyacetal resin composition.

The present moldings can be obtained by such molding processes as an injection molding process, a hot runner injection molding process, an outsert molding process, an insert molding process, a blow injection molding process, a high frequency mold heating injection molding process, a compression molding process, inflation molding process, a blow molding process, an extrusion molding process, or a cutting work of the extrusion molding products, etc. From the viewpoint of satisfying the characteristics required for the present invention, moldings obtained by an injection molding process are preferable.

The present moldings are preferably large-diameter gears having a pitch circle diameter of 60 mm or more, more preferably large-diameter gears having a pitch circle diameter of 100 mm or more, obtained by molding the present ABA type block copolymer or polyacetal resin composition.

Particularly preferable moldings are large-diameter gears having a pitch circle diameter of 60 mm or more, or 100 mm or more, for printers or copiers, obtained by injection molding.

The present moldings can be subjected, if required, to decoration such as laser marking, hot stamping, coating, printing, plating, etc. or posttreaments such as welding, bonding, annealing etc.

The present ABA type block copolymer or polyacetal resin composition can be used not only as materials for large-diameter gears, but also as materials for sliding parts to which polyacetal resins are usually used, for example, materials for various sliding parts used in OA machinery, typically printers and copiers; video machinery, typically VTR and video movie; music, image or information machinery, typically, cassette players, LD, MD, CD (including CD-ROM, CD-R and CD-RW), DVD (including DVD-ROM, DVD-R, DVD-RAM and DVD-Audio), navigation systems and mobile personal computers; communications equipments, typically portable phones and facsimile machines; automobile interior and exterior structural parts; industrial gadgets, typically, disposable cameras, toys, fasteners, conveyors, chains, bucles, office utensils and housing equipment, etc.

Typical part names are gears other than large-diameter ones, cams, gear cams, sliders, levers, key stems, key tops, ratchets, rollers, arms, steering wheels, buttons, fly wheels, clutches, joints, shafts, shaft bearings, guide roller, side plates, resin parts of outchassis, chassias, tray members, inner handle bars, outer handle bars, switches, through-anchors, tongues, and dials, etc.

EXAMPLES

The present invention will be described below, referring to Examples, to which the present invention will not be limited. Terms and test methods used in Examples and Comparative Examples are as follows:

1. Determination of Molecular Weights of ABA Type Block Copolymer and Polyacetal Copolymer Number average molecular weights of ABA type block copolymer and polyacetal copolymer were determined by a GPC unit (HLC-8120) made by Tosoh Corp. with two 30 cm-high columns (HFIP806) made by Showa Denko K.K., using HFIP as a carrier and PMMA made by Polymer Laboratories as a standard sample under such conditions as temperature: 40° C. and flow rate: 0.5 ml/min.

2. Identification of ABA Type Block Copolymer and Polyacetal Copolymer (1) Quantitative determination of alkylene glycol originating from the cyclic formal (or cyclic ether) in the ABA type block copolymer or polyacetal copolymer was carried out as follows:

At first, the polymer and 1 N hydrochloric acid were charged into a pressure bottle, heated at 130° C. for 2 hours, thereby hydrolyzing the ABA type block copolymer or polyacetal copolymer to obtain an alkylene glycol component originating from the cyclic formal (or cyclic ether). In case of the ABA type block copolymer, there was hydroxyalkylated, hydrogenated polybutadiene after the hydrolysis. The hydroxyalkylated, hydrogenated polybutadience was present as phase-separated from the aqueous solution. The alkylene glycol component present in the aqueous solution resulting from the hydrolysis was quantitatively determined by gas chromatography.

(2) The hydroxyalkylated, hydrogenated polybutadience present as phase-separated from the aqueous solution resulting from the hydrolysis of the ABA type block copolymer was separated by extraction from the aqueous solution resulting from the hydrolysis and the number average molecular weight of the hydroxyalkylated, hydrogenated polybutadiene separated by extraction was determined by a GPC unit (150C) made by Waters, using 1,2,4-trichlorobenzene as a carrier at 140° C.

(3) Number average molecular weights of ABA type block copolymer and polyacetal copolymer were determined by a GPC unit (HLC-8120, made by Tosoh Corp.) with two 30 cm-high columns (HFIP806, made by Showa Denko K.K.), using HFIP as a carrier and PMMA made by Polymer Laboratories as a standard sample under such conditions as temperature: 40° C. and flow rate: 0.5 ml/min.

(4) Monomer compositions, which constituted ABA type block copolymer and polyacetal copolymer as polymers, were identified from the foregoing (1), (2) and (3).

3. Measurement of Crystallization Time 5 mg of samples (ABA type block copolymer, polyacetal copolymer and polyacetal resin composition) were heated to 200° C. at 320° C./min., held at 200° C. for 2 minutes and cooled to 150° C. at 80° C./min. Time (sec.) required from the point when the sample holder temperature reached 150° C. till the point when an exothermic peak top due to crystallization of polyoxymethylene chain was detected by a differential scanning calorimeter was measured and regarded as a crystallization time.

4. Gear Molding

1) Kinds of Gears

Gears (I)

Spur gears with pitch circle diameter: 60 mm, module: 1, number of gear teeth: 60, pressure angle: 20°, gear tooth width: 5 mm web thickness: 2 mm, twisted angle: 0°, gates: 3 gates on web (gates are each positioned at an angular interval of 120° and gate size: 1.2 mm) and weight: about 10 g.

Gears (II)

Spur gears with pitch circle diameter: 100 mm, module: 1, number of gear teeth: 100, pressure angle: 20°, gear tooth width: 15 mm, web thickness: 2 mm, twisted angle: 0°, gates: 8 gates on web (gates each are positioned at an angular interval of 45° and gate size: 1.2 mm) and weight: about 51 g.

2) Molding Conditions

Molding was carried out with an injection molding machine (model SG50, made by Sumitomo Heavy Industries, Ltd.) under such conditions as cylinder temperature: 180–195° C., mold temperature: 80° C., injection speed: 50–60%, injection pressure: 60–70%, injection time: 10 sec. and cooling time: 15 sec. Furthermore, molding of gears (I) was carried out to make each weight 10 g and that of gears (II) to make each weight 51 g.

5. Determination of Gear Roundness

Outer peripheral shape of molded gear was measured by a cylindrical shape roundness meter (model: Round Test RA-400 made by Mitsutoyo K.K.) and an errors was given in $\mu$m by LSC method (a method of regarding a difference in radius between a circumcircle and an incircle in coaxial contact with a circle whose deviation square sum is minimum as an error by a method of least square center), and total pitch error ($\mu$m) of the gear was defined as roundness. The smaller the numerical value, the higher the roundness.

6. Determination of Gear Dimensional Stability

In place of measurement of changes in gear dimension after being left standing at 23° C. for a few months, the molded gears were left standing at 23° C. and 50 RH for 24 hours, and in case of gears (I) diameters between gear tooth tip ends in the line connecting the gate to the weld were measured, whereas in case of gear (II) diameters between gear tooth tip ends in the line between counterposed gates were measured. Then, the gears were annealed at 70° C. for 4 hours and left standing at 23° C. and 50 RH for 20 hours and then diameters between the gear tooth tip ends of gears (I) and(II) were again measured in the sammer as above to give dimensional differences before and after the annealing in $\mu$m (where the shrinking tendency is given in plus sign). The smaller the numerical value, the more distinguished the dimensional stability.

7. Determination of Gear Durability

Gear durability tester, made by Toshiba Corp. was used, and a gear (with the same shape as molded in the same manner as in the foregoing item 4) made from Tenac C4520, a commercially available polyacetal resin copolymer was set to the driving side, while a gear molded in the same manner as in the foregoing item 4 and left standing at 23° C. and 50 RH was set to the driven side, and the tester was put into continuously operation at 23° C. and 50 RH for 168 hours, while setting a revolution speed at the pitch circle to 0.5 m/s and a torque to 4.5 kgf-cm. Weight loss (mg) of both gears on the driving side and the driven side was measured as a wear amount. The lower the numerical value, the more distinguished the gear durability. Cases where gear teeth were broken before the lapse of 168 hours under these test conditions so that no continuous durability test was conducted were remarked as "gear tooth broken".

ABA Type Block Copolymer and Polyacetal Copolymer

Block Copolymer 1 and Polyacetal Copolymers 1 and 2

Polymerization Procedure

Biaxial paddle type continuous polymerizer with a jacket through which a heating medium could be passed was heated to 80° C., and the following raw materials (1)–(3) and a catalyst (4) were continuously fed thereto to conduct polymerization.

(1) trioxane: 133 moles/hr, (2) 1,3-dioxolane: 3.5 moles/hr

[2-methyl-1,3-dioxolaue content: 50 ppm, peroxide content: 1.2 ppm by weight in terms of hydrogen peroxide; admixed with 200 ppm of sterically hindered phenol and containing tetrakis [methylene-3-(3',5'-di-t-butyl-4'-hydroxyphenylpropionate)]methane], (3) hydrogenated polybutadiene at both ends of which were hydroxyethylated: 0.1 mole/hr

[in a liquid state and prepared by polymerizing butadiene in the presence of sodium as a catalyst, thereby obtaining polybutadiene having a 1,2-bond content of 80 mol % and a 1,4-bond content of 20 mol % (identified by $^1$H-NMR), the 1,4-bonds being randomly distributed with respect to the 1,2-bonds (polybutadiene that follows will be in the same structure as above, unless otherwise particularly mentioned), then hydroxyalkylating both ends of polybutadiene by ethylene oxide, followed by hydrogenation], Number average molecular weight: 2390

Molecular weight distribution (Mw/Mn): 1.5

Iodine value: 18 g-$I_2$/100 g (4) Catalyst (boron trifluoride di-n-butyl ether dissolved in cyclohexane): $5 \times 10^{-5}$ moles per mole of trioxane.

Polymers discharged from the polymerizer was put into an 1% aqueous triethylamine solution to completely deactivate the polymerization catalyst. Then, the polymers were filtered off, washed with acetone and dried in a vacuum drier set at 60° C. (the polymerization procedure will be hereinafter referred to as "Polymerization Procedure 1").

Identification of Polymers

The dried polymers were dissolved in HFIP and then cyclohexane was added thereto to reprecipitate the polymers. Residues obtained by distillation of all the precipitated polymers and the separated filtrate were analyzed with a GPC unit (150c, made by Waters, using 1,2,4-trichlorobenzene as a carrier) at 140° C., but no liquid hydroxyethylated, hydrogenated polybutadiene was detected. That is, it was found that all of liquid hydroxyethylated, hydrogenated polybutadiene acted as a chain-transfer agent during the polymerization.

Then, the dried polymers were heated at 190° C. for 30 minutes in a nitrogen atmosphere and the formaldehyde generated during the removal of unstable terminal chains of polymers was quantitatively determined. For comparison, polymers were prepared in the same manner as in the above-mentioned polymerization procedure 1 except that an equimolar amount of methanol was used in place of the hydrogenated polybutadiene hydroxyethylated at both ends, and removal of unstable terminal chains of the resulting polymers was likewise conducted to quantitatively determine the generated formaldehyde. The polymers obtained by polymerization, using the hydrogenated polybutadiene hydroxyethylated at both ends generated formaldehyde in an amount 1.98 times (twice within a range of measurement error) as large as that from the polymers obtained by polymerization, using an equimolar amount of methanol. From this fact, it has been found that the polymers obtained according to the above-mentioned polymerization procedure 1 was not an AB type, but an ABA type block copolymer.

Furthermore, number average molecular weight of the dried polymers was identified by GPC and monomer composition analysis was carried out by a hydrochloric acid decomposition method. As a result, the polymers could be identified to have an ABA type polymer structure as shown by the following formula (6). Formula (6) and formulae (7)–(25) which follow model-wise show proportions of ($CH_2O$) units and ($CH_2CH_2O$) units, which constitute Segments A each, (as given by moles, respectively) and proportions of ($C(CH_2CH_3)HCH_2$) units and ($CH_2CH_2CH_2CH_2$) units, which constitute Segment B (as given by moles, respectively), and does not show a bond state of the respective units in Segments A and Segment B. That is, formula (6) shows the presence of 1,700 moles of ($CH_2O$) units and 15 moles of ($CH_2CH_2O$) units, which constitute Segments A each, and the presence of 33 moles of $(C(CH_2CH_3)HCH_2)$ units and 8 moles of $(CH_2CH_2CH_2CH_2)$ units, which constitute Segment B. Furthermore, formula (6) and formulae (7)–(25) which follow never show the presence of $(CH_2O)$ units and $(CH_2CH_2O)$ units, which constitute Segments A each, as blocks, respectively, in the polymer chain and also never show the presence of $(C(CH_2CH_3)HCH_2)$ units and $(CH_2CH_2CH_2CH_2)$ units, which constitute Segment B, as blocks, respectively.

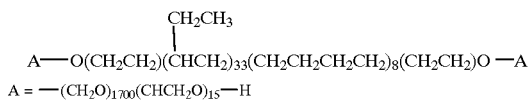

(6)

Structure of polymers prepared in the same manner as in the above-mentioned Polymerization Procedure 1 except that methanol was used as a chain-transfer agent is given by the following formula (7):

$$CH_3O-(CH_2O)_{3400}(CH_2CH_2O)_{30}-H \tag{7}$$

Terminal Stabilization Treatment of ABA Type Block Copolymer

100 Parts by weight of block copolymer represented by the foregoing formula (6) was brought into contact with 2 parts by weight of water as a terminal stabilizing agent and 1 part by weight of triethylamine as a basic compound, followed by melt kneading, thereby hydrolyzing and stabilizing the hydroxyoxymethylene chains as unstable terminal chains. In terminal stabilization, the block copolymer represented by the foregoing formula (6) was fed to a vented biaxial extruder set to 200° C. to conduct melt kneading. Then, water and triethylamine were continuously fed to a position just before the terminal stabilization zone of the extruder to conduct kneading with the block copolymer. Then, formaldehyde, water and triethylamine were removed in the degassing zone to conduct terminal stabilization of the block copolymer. Degassing was carried out while setting the vacuum degree of vent section in the degassing zone to 4 kPa. Block copolymer was extruded as strands through the dies of the extruder and then pelletized (the terminal stabilization procedure will be hereinafter referred to as "Terminal Stabilization Treatment 1").

Structural analysis of the terminal-stabilized block copolymer by the above-mentioned method revealed that it had a structure represented by the following formula (8). That is, it was found that the oxymethylene units of Segments A each in the block copolymer represented by formula (6) were hydrolyzed and removed (terminal-stabilized) by 110 moles on average.

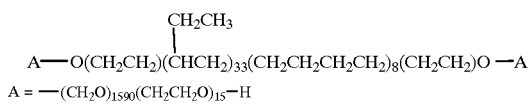

(8)

Copolymer of formula (7) obtained by polymerization upon chain transfer by methanol was also subjected to copolymer terminal stabilization in the same manner as Terminal Stabilization Treatment 1, and structural analysis revealed that it had a structure represented by the following formula (9). That is, 113 moles of oxymethylene was hydrolyzed and removed.

$$CH_3O-(CH_2O)_{3287}(CH_2CH_2O)_{30}-H \tag{9}$$

In this manner, 110×2 moles of oxymethylene units were decomposed into formaldehyde from the block copolymer of formula (6) by terminal stabilization treatment and 113 moles of oxymethylene units were decomposed into formaldehyde from the copolymer of formula (7), and their ratio was 220/113=1.95, which was in good agreement to the aforementioned result (1.98 times as large) of the amount of formaldehyde generated by heating the polymers in a nitrogen atmosphere.

(Preparation of Block Copolymer 1 and Copolymers 1 and 2)

100 parts by weight of the thus obtained ABA type block copolymer of formula (8) was admixed with 0.3 parts by weight of triethylene glycol-bis-(3-(3-t-butyl-5-methyl-4-hydroxyphenyl) propionate as an antioxidant and 0.05 parts by weight of nylon 6—6 pulverized to an average particle size of 4 μm, and then melt kneaded again by the aforementioned biaxial extruder, thereby obtaining a block copolymer composition (which will be hereinafter referred to as "Block Copolymer 1").

Furthermore, the copolymer of formula (9) obtained by polymerization through methanol chain-transfer was admixed with the antioxidant and the nylon 6—6 in the same manner as in case of Block Copolymer 1, followed by melt kneading, thereby obtaining a copolymer composition (which will be hereinafter referred to as "Copolymer 1").

Still furthermore, a copolymer was prepared in the same manner as in the above-mentioned Polymerization Procedure 1, except that methylal $[(CH_3O)_2CH_2]$ was used as a chain-transfer agent in place of the hydrogenated polybutadiene hydroxyethylated at both ends, followed by polymer terminal stabilization in the same manner as in Terminal Stabilization Treatment 1, the resulting copolymer was admixed with the antioxidant and the nylon 6—6 in the same manner as in case of Block Copolymer 1, followed by melt kneading, thereby obtaining a copolymer composition (which will be hereinafter referred to as "Copolymer 2").

Physical Properties of Block Copolymer 1 and Copolymers 1 and 2

Crystallization time of Block Copolymer 1 and Copolymers 1 and 2, and roundness, dimensional stability and durability of gears (I) and (II) molded therefrom each were determined. The results are shown in Table 1.

TABLE 1

| | Block Co-polymer 1 | Copolymer 1 (Comp. Ex.) | Copolymer 2 (Comp. Ex.) |
|---|---|---|---|
| Crystallization time (sec) Gear (I) | 20 | 150 | 135 |
| Roundness (μm) | 25 | 30 | 34 |
| Dimensional stability (μm) | 31 | 48 | 47 |
| Durability (mg) Gear (II) | 50 | Gear teeth broken | Gear teeth broken |
| Roundness (μm) | 20 | 35 | 33 |

TABLE 1-continued

|  | Block Co-polymer 1 | Copolymer 1 (Comp. Ex.) | Copolymer 2 (Comp. Ex.) |
|---|---|---|---|
| Dimensional stability ($\mu$m) | 46 | 77 | 75 |
| Durability (mg) | 46 | Gear teeth broken | Gear teeth broken |

Block copolymers having number average molecular weights of 20,000 and 200,000, respectively, were obtained in the same manner as in Polymerization Procedure 1, except that the feed rate per hour of the liquid hydrogenated polybutadiene hydroxyethylated at both ends to the biaxial paddle-type continuous polymerizer was changed. The resulting block copolymers were subjected to copolymer terminal stabilization in the same manner as in Terminal Stabilization Treatment 1, followed by admixing with the antioxidant and the nylon 6—6 and melt kneading in the same manner as in case of Block Copolymer 1, thereby obtaining block copolymer compositions. Crystallization time of the compositions and roundness, dimensional stability and durability of gears molded from the compositions, respectively, were evaluated and found to have equivalent performances to those of Block Copolymer 1.

Block Copolymer 2–4

Polymers were prepared in the same manner as in the aforementioned Polymerization Procedure 1 except that 3 kinds of liquid hydrogenated polybutadienes each hydroxyethylated at both ends (1,2-bond contents: 70, 95 and 98 mol %, respectively; number average molecular weight: 2390 for all 3 kinds; iodine value: 18 g-$I_2$/100 g for all 3 kinds; and Mw/Mn=1.5) were used in place of the liquid hydrogenated polybutadiene hydroxyethylated at both ends of Block Copolymer 1 and subjected to polymer terminal stabilization in the same manner as in Terminal Stabilization Treatment 1, thereby obtaining block copolymers represented by the following formula (10), (11) and (12), respectively.

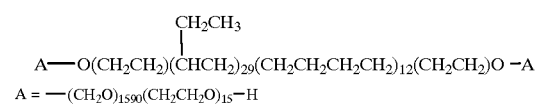

(10)

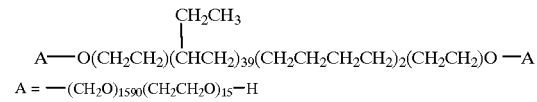

(11)

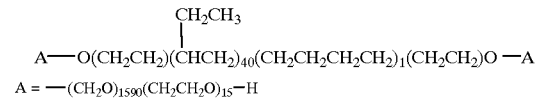

(12)

These block copolymers each were admixed with the antioxidant and the nylon 6—6 and melt kneaded in the same manner as in case of Block Copolymer 1, thereby obtaining block copolymer compositions. The resulting block copolymer compositions will be hereinafter referred to as "Block Copolymer 2" (1,2-bond content of polybutadiene: 70 mol %, which comprises the block copolymer of formula (10)), "Block Copolymer 3" (1,2-bond content of polybutadiene: 95 mol %, and which comprises the block copolymer of formula (11)), and "Block Copolymer 4" (1,2-bond content of polybutadiene: 98 mol %, and which comprises the block copolymer of formula (12)), respectively. Results of physical property determination of Block Copolymers 2–4 and gears molded therefrom are shown in Table 2.

TABLE 2

|  | Block Co-polymer 2 | Block Co-polymer 3 | Block Co-polymer 4 |
|---|---|---|---|
| Crystallization time (sec) | 22 | 20 | 23 |
| Gear (I) |  |  |  |
| Roundness ($\mu$m) | 28 | 25 | 29 |
| Dimensional stability ($\mu$m) | 35 | 31 | 37 |
| Durability (mg) | 55 | 50 | 54 |
| Gear (II) |  |  |  |
| Roundness ($\mu$m) | 23 | 20 | 23 |
| Dimensional stability ($\mu$m) | 49 | 46 | 48 |
| Durability (mg) | 49 | 46 | 49 |

Block Copolymers 5–8

Polymers were prepared in the same manner as in the aforementioned Polymerization Procedure 1 except that 4 kinds of liquid hydrogenated polybutadienes each hydroxyethylated at both ends having number average molecular weights of 1390, 3390, 4390 and 9390, respectively, were used in place of the liquid hydrogenated polybutadiene hydroxyethylated at both ends of Block Copolymer 1, and subjected to terminal stabilization in the same manner as in Terminal Stabilization Treatment 1, thereby obtaining block copolymers represented by the following formulae ((13), (14), (15) and (16), respectively.

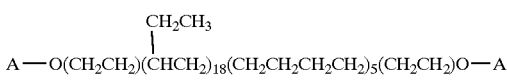

(13)

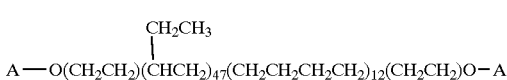

(14)

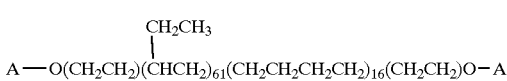

(15)

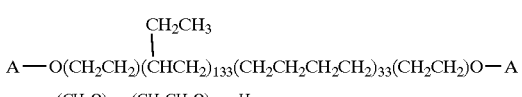

(16)

These block copolymers were admixed with the antioxant and the nylon 6—6, and melt kneaded in the same manner as in case of Block Copolymer 1, thereby obtaining block copolymer compositions.

The resulting block copolymer compositions will be hereinafter referred to as "Block Copolymer 5" (number average molecular weight of liquid hydrogenated polybutadiene hydroxyethylated at both ends: 1390, and which comprises the block copolymer of formula (13)), "Block Copolymer 6"

(number average molecular weight of liquid hydrogenated polybutadiene hydroxyethylated at both ends: 3390 and which comprises the block copolymer of formula (14)), "Block Copolymer 7" (number average molecular weight of liquid hydrogenated polybutadiene hydroxyethylated at both ends: 4390, and which comprises the block copolymer of formula (15)), and "Block Copolymer 8" (number average molecular weight of liquid hydrogenated polybutadiene hydroxyethylated at both ends: 9390, and which comprises the block copolymer of formula (16)), respectively. Results of physical property determination of Block Copolymer 5–8 and gears molded therefrom are shown in Table 3.

TABLE 3

|  | Block Copolymer 5 | Block Copolymer 6 | Block Copolymer 7 | Block Copolymer 8 |
| --- | --- | --- | --- | --- |
| Crystallization time (sec) | 19 | 20 | 20 | 21 |
| Gear (I) |  |  |  |  |
| Roundness ($\mu$m) | 28 | 25 | 25 | 28 |
| Dimensional stability ($\mu$m) | 35 | 31 | 31 | 35 |
| Durability (mg) | 55 | 50 | 50 | 56 |
| Gear (II) |  |  |  |  |
| Roundness ($\mu$m) | 23 | 20 | 20 | 24 |
| Dimensional stability ($\mu$m) | 49 | 46 | 46 | 49 |
| Durability (mg) | 49 | 46 | 46 | 49 |

Block Copolymer 9

Polymer was prepared in the same manner as in the aforementioned Polymerization Procedure 1 except that hydrogenated polybutadiene hydroxyethylated at both ends, which was in a wax state at 23° C. and 1 atom (number average molecular weight: 2390; iodine value: 11 g-$I_2$/100 g; Mw/Mn=1.5) obtained by preparing living polymer of polybutadiene containing 20 mol % of 1,2-bonds and 80 mol % of 1,4-bonds in the presence of naphthalene dilithium as a catalyst in cyclohexane as a solvent, then reacting the living polymer with ethylene oxide, followed by hydrogenation was used in place of the liquid hydrogenated polybutadiene hydroxyethylated at both ends of Block Copolymer 1, and subjected to polymer terminal stabilization in the same manner as in Terminal Stabilization Treatment 1, thereby obtaining a block copolymer represented by the following formula (17):

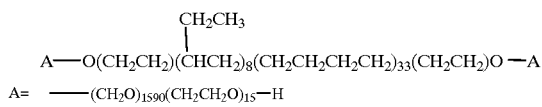

(17)

The block copolymer was admixed with the antioxidant and the nylon 6—6, and melt kneaded in the same manner as in case of Block Copolymer 1, thereby obtaining a block copolymer composition (hereinafter referred to as "Block Copolymer 9")).

Block Copolymer 10

Polymer was prepared in the same manner as in the aforementioned Polymerization Procedure 1, except that liquid hydrogenated polybutadiene hydroxylated at both ends (number average molecular weight: 2330; iodine value; 18 g-$I_2$/100 g; Mw/Mn=2) obtained by polymerizing butadiene by hydrogen peroxide and then hydrogenating the resulting polybutadiene modified by hydroxyl groups at both ends containing 80 mol % of 1,2-bonds and 20 mol % of 1,4-bonds (in a structure where not hydroxyethyl groups but hydroxyl groups were bonded to both ends of polybutadiene) was used as a chain-transfer agent in place of the liquid hydrogenated polybutadiene hydroxyethylated at both ends of Block Copolymer 1, and subjected to polymer terminal stabilization in the same manner as in Terminal Stabilization Treatment 1, thereby obtaining a block copolymer represented by the following formula (18):

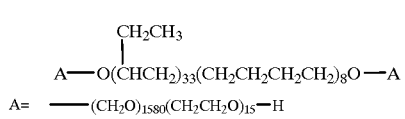

(18)

The block copolymer was admixed with the antioxidant and the nylon 6—6, and melt kneaded in the same manner as in case of Block Copolymer 1, thereby obtaining a block copolymer composition (hereinafter referred to as "Block Copolymer 10")).

Block Copolymer 11

Polymer was prepared in the same manner as in the foregoing Polymerization Procedure 1 except that waxy hydrogenated polybutadiene hydroxylated at both ends of polybutadiene (number average molecular weight: 2330; iodine value: 18 g-$I_2$/100 g; Mw/Mn=2) by polymerizing butadiene by hydrogen peroxide and different polymerization conditions from those for the aforementioned Block Copolymer 10 and hydrogenating the resulting polybutadiene modified by hydroxyl groups at both ends (1,2-bond content of polybutadiene: 20 mol % and 1,4-bond content: 80 mol % was) used as a chain-transfer agent, and subjected to polymer terminal stabilization in the same manner as Terminal Stabilization Treatment 1, thereby obtaining a block copolymer represented by the following formula (19):

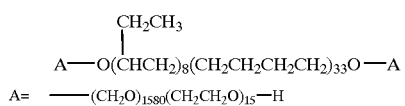

(19)

The block copolymer was admixed with the antioxidant and the nylon 6—6 and melt kneaded in the same manner as in case of Block Copolymer 1, thereby obtaining a block copolymer composition (hereinafter referred to as "Block Copolymer 11")). Results of physical property determination of Block Copolymers 9, 10 and 11 and gears molded therefrom are shown in Table 4.

TABLE 4

|  | Block Co-polymer 9 (Comp. Ex.) | Block Co-polymer 10 (Comp. Ex.) | Block Co-polymer 11 (Comp. Ex.) |
|---|---|---|---|
| Crystallization time (sec) | 135 | 140 | 141 |
| Gear (I) |  |  |  |
| Roundness (μm) | 33 | 30 | 35 |
| Dimensional stability (μm) | 46 | 45 | 46 |
| Durability (mg) | 130 | 120 | Gear teeth broken |
| Gear (II) |  |  |  |
| Roundness (μm) | 36 | 35 | 36 |
| Dimensional stability (μm) | 78 | 76 | 78 |
| Durability (mg) | Gear teeth broken | Gear teeth broken | Gear teeth broken |

Copolymer 3

Polymer was prepared in the same manner as in the aforementioned Polymerization Procedure 1, except that hydrogenated polybutadiene hydroxyethylated at one end thereof, which was in a liquid state at 23° C. and 1 atm (number average molecular weight: 2340, iodine value: 18 g-$I_2$/100 g; Mw/Mn=1.8; 1,2-bond content of polybutadiene: 80 mol %; 1,4-bond content: 20 mol %), prepared by deactivating one of the living anion terminals of polybutadiene was used as a chain-transfer agent in place of the liquid hydrogenated polybutadiene hydroxyethylated at both ends of Block Copolymer 1, and subjected to polymer terminal stabilization in the same manner as in Terminal Stabilization Treatment 1, thereby obtaining a copolymer represented by the following formula (20):

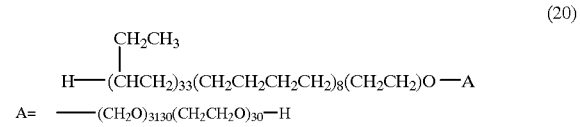

(20)

Block Copolymer 12

Polymer was prepared in the same manner as in the aforementioned Polymerization Procedure 1, except that hydrogenated polybutadiene hydroxyethylated at both ends, which was in a liquid state at 23° C. and 1 atm (number average molecular weight: 2390; iodine value: 18 g-$I_2$/100 g; Mw/Mn=1.5) obtained by preparing living polymer of polybutadiene containing 99.5 mol % of 1,2-bonds and 0.5 mol % of 1,4-bonds, followed by reaction with ethylene oxide and hydrogenation, was used in place of the liquid hydrogenated polybutadiene hydroxyethylated at both ends of Block Copolymer 1, and subjected to polymer terminal stabilization in the same manner as in Terminal Stabilization Treatment 1, thereby obtaining a block copolymer represented by the following formula (21):

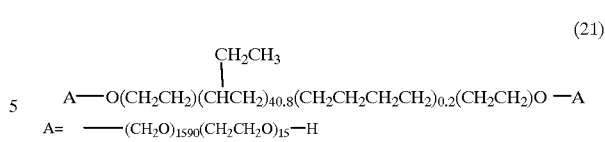

(21)

The block copolymer was admixed with the antioxidant and the nylon 6—6 and melt kneaded in the same manner as in case of Block Copolymer 1, thereby obtaining a block copolymer composition (hereinafter referred to as "Block Copolymer 12")). Results of physical property determination of Copolymer 3 and Block Copolymer 12 and gears molded therefrom are shown in Table 5.

TABLE 5

|  | Copolymer 3 (Comp. Ex.) | Block Co polymer 12 (Comp. Ex.) |
|---|---|---|
| Crystallization time (sec) | 100 | 30 |
| Gear (I) |  |  |
| Roundness (μm) | 30 | 30 |
| Dimensional stability (μm) | 41 | 40 |
| Durability (mg) | 100 | 70 |
| Gear (II) |  |  |
| Roundness (μm) | 35 | 30 |
| Dimensional stability (μm) | 70 | 75 |
| Durability (mg) | 90 | 80 |

Block Copolymers 13 and 14

Polymers were prepared in the same manner as in the aforementioned Polymerization Procedure 1, except that the iodine value of the liquid hydrogenated polybutadiene hydroxyethylated at both ends of Block Copolymer 1 was changed to 0 g or 25 g-$I_2$/100 g, and subjected to polymer terminal stabilization in the same manner as in Terminal Stabilization Treatment 1, thereby obtaining two different kinds of block copolymers only in the iodine value from that of Block Copolymer 1.

The block copolymers were admixed with the antioxidant and the nylon 6—6 and melt kneaded in the same manner as in case of Block Copolymer 1, thereby obtaining block copolymer compositions. The resulting block copolymer compositions will be hereinafter referred to as "Block Copolymer 13" (iodine value: 0) and "Block Copolymer 14" (iodine value: 25), respectively. Results of physical property determination of Block Copolymers 13 and 14 and gears molded therefrom are shown in Table 6.

TABLE 6

|  | Block Co-polymer 13 | Block Co-polymer 14 (Comp. Ex.) |
|---|---|---|
| Crystallization time (sec) | 20 | 30 |
| Gear (I) |  |  |
| Roundness (μm) | 25 | 43 |
| Dimensional stability (μm) | 31 | 35 |
| Durability (mg) | 50 | 110 |

TABLE 6-continued

|  | Block Co-polymer 13 | Block Co-polymer 14 (Comp. Ex.) |
|---|---|---|
| Gear (II) | | |
| Roundness (μm) | 20 | 22 |
| Dimensional stability (μm) | 46 | 46 |
| Durability (mg) | 46 | 100 |

Block Copolymers 15 and 16

Polymers were prepared in the same manner as in the afore-mentioned Polymerization Procedure 1, except that the liquid hydrogenated polybutadiene hydroxyethylated at both ends of Block Copolymer 1 was replaced with hydrogenated polybutadiene hydroxybutylated at both ends or hydrogenated polybutadiene hydroxyhexylated at both ends, and subjected to polymer terminal stabilization in the same manner as in Terminal Stabilization Treatment 1, thereby obtaining two kinds of block copolymers having the same structure as that of Block Copolymer 1 except that the hydroxyethyl residues of Block Copolymer 1 was changed to hydroxybutyl residues or hydroxyhexyl residues.

The block copolymers were admixed with the antioxidant and the nylon 6—6 and melt kneaded in the same manner as in case of Block Copolymer 1, thereby obtaining block copolymer compositions. The resulting block copolymer compositions will be hereinafter referred to as "Block Copolymer 15" (with hydroxybutyl residues) and "Block Copolymer 16" (with hydroxyhexyl residues), respectively. Results of physical property determination of Block Copolymers 15 and 16 and gears molded therefrom are shown in Table 7.

TABLE 7

|  | Block Co-polymer 15 | Block Co-polymer 16 |
|---|---|---|
| Crystallization time (sec) | 22 | 28 |
| Gear (I) | | |
| Roundness (μm) | 28 | 30 |
| Dimensional stability (μm) | 34 | 35 |
| Durability (mg) | 55 | 58 |

TABLE 7-continued

|  | Block Co-polymer 15 | Block Co-polymer 16 |
|---|---|---|
| Gear (II) | | |
| Roundness (μm) | 24 | 25 |
| Dimensional stability (μm) | 50 | 53 |
| Durability (mg) | 51 | 52 |

Block Copolymers 17–20

Polymers were prepared in the same manner as in the aforementioned Polymerization Procedure 1, except that compositions of fed monomers were changed in the polymerization Block Copolymer 1, and subjected to terminal stabilization in the same manner as in Terminal Stabilization Treatment 1, thereby obtaining 4 kinds of polymers represented by the following formulae (22), (23), (24) and (25):

$$A-O(CH_2CH_2)(\overset{CH_2CH_3}{\underset{|}{C}HCH_2})_{33}(CH_2CH_2CH_2CH_2)_8(CH_2CH_2)O-A \quad (22)$$
$$A= -(CH_2O)_{1590}(CH_2CH_2O)_6-H$$

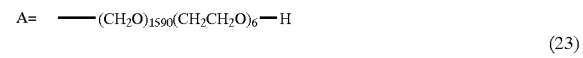

$$A-O(CH_2CH_2)(\overset{CH_2CH_3}{\underset{|}{C}HCH_2})_{33}(CH_2CH_2CH_2CH_2)_8(CH_2CH_2)O-A \quad (23)$$
$$A= -(CH_2O)_{1590}(CH_2CH_2O)_{30}-H$$

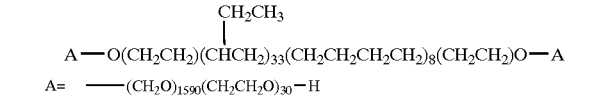

$$A-O(CH_2CH_2)(\overset{CH_2CH_3}{\underset{|}{C}HCH_2})_{33}(CH_2CH_2CH_2CH_2)_8(CH_2CH_2)O-A \quad (24)$$
$$A= -(CH_2O)_{1590}(CH_2CH_2O)_1-H$$

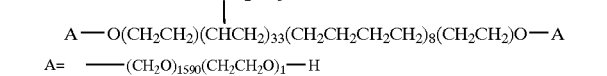

$$A-O(CH_2CH_2)(\overset{CH_2CH_3}{\underset{|}{C}HCH_2})_{33}(CH_2CH_2CH_2CH_2)_8(CH_2CH_2)O-A \quad (25)$$
$$A= -(CH_2O)_{1590}(CH_2CH_2O)_{90}-H$$

The block polymers each were admixed with the antioxidant and the nylon 6—6 and melt kneaded in the same manner as in case of Block Copolymer 1, thereby obtaining block copolymer compositions. The block copolymer compositions will be hereinafter referred to as "Block Copolymer 17" (comprising the block copolymer of formula (22)), "Block Copolymer 18" (comprising the block copolymer of formula (23)), "Block Copolymer 19" (comprising the block copolymer of formula (24)) and "Block Copolymer 20" (comprising the block copolymer of formula (25)), respectively. Results of physical property determination of Block Copolymers 16–20 and gears molded therefrom are shown in Table 8.

TABLE 8

|  | Block Copolymer 17 | Block Copolymer 18 | Block Copolymer 19 (Comp. Ex.) | Block Copolymer 20 (Comp. Ex.) |
|---|---|---|---|---|
| Crystallization time (sec) | 17 | 22 | 17 | 35 |
| Gear (I) | | | | |
| Roundness (μm) | 27 | 23 | 45 | 45 |
| Dimensional stability (μm) | 34 | 30 | 50 | 35 |
| Durability (mg) | 48 | 51 | 53 | 80 |

TABLE 8-continued

|  | Block Copolymer 17 | Block Copolymer 18 | Block Copolymer 19 (Comp. Ex.) | Block Copolymer 20 (Comp. Ex.) |
|---|---|---|---|---|
| Gear (II) | | | | |
| Roundness ($\mu$m) | 24 | 20 | 44 | 45 |
| Dimensional stability ($\mu$m) | 50 | 44 | 60 | 50 |
| Durability (mg) | 47 | 50 | 53 | 90 |

Polyacetal Copolymer Resin Composition

Compositions 1–8

Block Copolymer 1 or Copolymer 2 and thermoplastic resin were mixed together in formulations given in Tables 9 and 10, and melt kneaded, thereby preparing polyacetal resin compositions (Compositions 1–8), and physical properties of gears molded from the compositions were determined. The results are shown in Tables 9 and 10.

Peeling test of SFD thin moldings was conducted and evaluated in the following procedure:

Pellets of each composition was dried at 80° C. for 3 hours and molded into 5 spiral thin moldings (thickness: 1 mm; width 5 mm) by a 5-ounce molding machine (model SH-75 made by Sumitomo Heavy Industries, Ltd.) set to a cylinder temperature of 200° C. at a mold temperature of 80° C. and an injection pressure of 7.4 MPa, while changing the injection speed, and peeling state of molding surfaces was visually inspected. When no peeling was observed on all 5 thin moldings, it was judged that no peeling took place at that injection speed.

Evaluation basis of peelability are as follows:

⊚: not peeled up to injection speed of 80%.

○: not peeled up to injection speed of 60%, but peeled at injection speed of 80%.

Δ: not peeled up to injection speed of 40% but peeled at injection speed of 60%.

>: not peeled up to injection speed of 20% but peeled at injection speed of 40%.

>X: peeled at injection speed of 20%.

TABLE 9

|  | Composition 1 | Composition 2 | Composition 3 (Comp. Ex.) | Composition 4 (Comp. Ex.) |
|---|---|---|---|---|
| Block Copolymer 1 (Parts by weight) | 100 | 100 | | |
| Copolymer 2 (Parts by weight) | | | 100 | 100 |
| Polyurethane-based resin (Parts by weight) | 40 | | 40 | |
| Polyester-based resin (Parts by weight) | | 40 | | 40 |
| Crystallization time (sec) | 28 | 24 | 138 | 140 |
| Gear (I) | | | | |
| Roundness ($\mu$m) | 29 | 30 | 45 | 48 |
| Dimensional stability ($\mu$m) | 33 | 31 | 40 | 44 |
| Durability (mg) | 55 | 59 | 150 | Gear teeth broken |
| Gear (II) | | | | |
| Roundness ($\mu$m) | 27 | 29 | 41 | 45 |
| Dimensional stability ($\mu$m) | 52 | 49 | 69 | 73 |
| Durability (mg) | 54 | 57 | Gear teeth broken | Gear teeth broken |
| SFD peelability | ⊚ | ⊚ | Δ | X |

Polyurethane-based resin: Miractran P22M, made by Japan Miractran
Polyester-based resin: Hytrel 5557M, made by Toray-DuPont K.K.

TABLE 10

|  | Composition 5 | Composition 6 | Composition 7 (Comp. Ex.) | Composition 8 (Comp. Ex.) |
|---|---|---|---|---|
| Block Copolymer 1 (Parts by weight) | 100 | 100 | | |
| Copolymer 2 (Parts by weight) | | | 100 | 100 |
| Polyacryl-based resin (Parts by weight) | 40 | | 40 | |
| Polyamide-based resin (Parts by weight) | | 40 | | 40 |
| Crystallization time (sec) | 26 | 28 | 120 | 125 |

TABLE 10-continued

|  | Composition 5 | Composition 6 | Composition 7 (Comp. Ex.) | Composition 8 (Comp. Ex.) |
|---|---|---|---|---|
| Gear (I) |  |  |  |  |
| Roundness (μm) | 29 | 29 | 41 | 43 |
| Dimensional stability (μm) | 31 | 30 | 41 | 41 |
| Durability (mg) | 60 | 56 | Gear teeth broken | Gear teeth broken |
| Gear (II) |  |  |  |  |
| Roundness (μm) | 28 | 27 | 40 | 41 |
| Dimensional stability (μm) | 49 | 48 | 70 | 71 |
| Durability (mg) | 58 | 54 | Gear teeth broken | Gear teeth broken |
| SFD peelability | ⊚ | ⊚ | XX | XX |

Polyacryl-based resin: DELPET SR6200 made by Asahi Chemical Industry Co., Ltd.
Polyamide-based resin: DAIAMID L1274KH, made by Daicel-Huels K.K.

Compositions 9–12

Block Copolymer 1, Copolymer 2 and liquid ethylene (10 mol %)-propylene (90 mol %) random copolymer (Mn=5220, Mw/Mn=1.3, given in Table 11 as "Liquid Random Copolymer 1" obtained by polymerization in the presence of phenoxyimine complex as a catalyst were mixed together in formulations given in Table 11 and melt kneaded, thereby preparing polyacetal resin compositions (compositions 9–12), and the physical properties of gears molded from the compositions were determined. The results are shown in Table 11.

TABLE 11

|  | Composition 9 | Composition 10 | Composition 11 | Composition 12 (Comp. Ex.) |
|---|---|---|---|---|
| Block Copolymer 1 (Parts by weight) | 20 | 30 | 70 | 10 |
| Copolymer 2 (Parts by weight) | 80 | 70 | 30 | 90 |
| Liquid Random Copolymer 1 (Parts by weight) | 3 | 3 | 3 | 3 |
| Crystallization time (sec) | 50 | 30 | 20 | 140 |
| Gear (I) |  |  |  |  |
| Roundness (μm) | 27 | 26 | 25 | 30 |
| Dimensional stability (μm) | 34 | 31 | 31 | 47 |
| Durability (mg) | 38 | 36 | 35 | Gear teeth broken |
| Gear (II) |  |  |  |  |
| Roundness (μm) | 24 | 20 | 20 | 34 |
| Dimensional stability (μm) | 49 | 47 | 46 | 76 |
| Durability (mg) | 39 | 38 | 37 | Gear teeth broken |
| SFD peelability | ⊚ | ⊚ | ⊚ | X |

Compositions 13–16

Block Copolymer 1, Copolymer 1 and liquid ethylene (10 mol %)-propylene (90 mol %) random copolymer (Mn=5220; Mw/Mn=1.8; given in Table 12 as "Liquid Random Copolymer 2") obtained by polymerization in the presence of Ziegler catalyst were mixed together in formulations of Table 12 and melt kneaded, thereby preparing polyacetal resin compositions (Composition 13–16). Physical properties of gears molded from the compositions were determined. The results are shown in Table 12.

TABLE 12

|  | Composition 13 | Composition 14 | Composition 15 | Composition 16 |
|---|---|---|---|---|
| Block Copolymer 1 (Parts by weight) | 70 | 70 | 70 | 70 |
| Copolymer 2 (Parts by weight) | 30 | 30 | 30 | 30 |
| Liquid Random Copolymer 2 (Parts by weight) | 3 | 0.1 | 4 | 6 |
| Crystallization time (sec) | 20 | 20 | 20 | 30 |
| Gear (I) |  |  |  |  |
| Roundness (μm) | 23 | 23 | 23 | 23 |
| Dimensional stability (μm) | 29 | 30 | 29 | 30 |
| Durability (mg) | 32 | 45 | 32 | 43 |
| Gear (II) |  |  |  |  |
| Roundness (μm) | 18 | 20 | 18 | 19 |
| Dimensional stability (μm) | 42 | 47 | 42 | 46 |
| Durability (mg) | 32 | 41 | 32 | 40 |
| SFD peelability | ⊚ | ⊚ | ⊚ | ⊚ |

Compositions 17–23

Block Copolymer 1, Copolymer 2 and α-olefin copolymer graft copolymerized with one part by weight of maleic anhydride were mixed together in formulations of Table 13 and melt kneaded, thereby preparing polyacetal resin compositions (Compositions 17–23), and physical properties of gears molded from the compositions were determined. The results are shown in Table 13.

Determination of repeated impact strength was made as follows:

Notched test pieces (according to ASTM-D256) were tested with a repeated impact tester made by Toyo Seiki K.K. at 23° C. with 310 g load×20 mm falling height at a frequency of 60 impacts/min. and number of repeated impacts until breaking was counted. The larger the numerical value, the more distinguished the repeated impact fatigue characteristics.

TABLE 13

|  | Composition 17 | Composition 18 | Composition 19 | Composition 20 | Composition 21 (Comp. Ex.) | Composition 22 (Comp. Ex.) | Composition 23 (Comp. Ex.) |
|---|---|---|---|---|---|---|---|
| Block Copolymer 1 (Parts by weight) | 70 | 70 | 70 | 70 | | | |
| Copolymer 2 (Parts by weight) | 30 | 30 | 30 | 30 | 100 | 100 | 100 |
| Maleic anhydride modified α-olefin copolymer ① (Parts by weight) | 20 | 40 | 100 | | | 40 | |
| Maleic anhydride modified α-olefin copolymer ② (Parts by weight) | | | | 40 | | | 40 |
| Crystallization time (sec) | 22 | 23 | 23 | 20 | 135 | 145 | 142 |
| Gear (I) | | | | | | | |
| Roundness (μm) | 26 | 28 | 30 | 27 | 34 | 43 | 43 |
| Dimensional stability (μm) | 32 | 31 | 29 | 31 | 47 | 40 | 40 |
| Durability (mg) | 52 | 57 | 60 | 56 | Gear teeth broken | Gear teeth broken | Gear teeth broken |
| Gear (II) | | | | | | | |
| Roundness (μm) | 23 | 25 | 26 | 24 | 33 | 41 | 41 |
| Dimensional stability (μm) | 47 | 45 | 44 | 45 | 75 | 71 | 70 |
| Durability (mg) | 49 | 53 | 58 | 54 | Gear teeth broken | Gear teeth broken | Gear teeth broken |
| SFD peelability | ⊚ | ⊚ | ⊚ | ⊚ | ⊚ | XX | XX |
| Repeated impact strength (Number of impacts till breaking) | 12500 | 19800 | 27700 | 21800 | 4500 | 1440 | 1410 |

Maleic anhydride-modified α-olefin copolymer ①: ethylene (80 mol %) - 1,butone (20 mol %)
Maleic anhydride-modified α-olefin copolymer ②: ethylene (70 mol %) - 1,octene (30 mol %)

Compositions 24–30

Block Copolymer 1, Copolymer 2 and styrene-based elastomer were mixed together in formulations of Table 14, thereby preparing polyacetal resin compositions (Compositions 24–30), and physical properties of gears molded from the compositions were determined. Results are shown in Table 14.

Vibration controllability was determined by fixing one end of a dumbbell shaped injection mold, 3.0 mm thick×13 mm wide×175 mm long, in an anechoic room, hitting the fixed edge at the root by an impulse hammer and measuring the emitted sounds, thereby obtaining a frequency response function between vibration force signals of hammer and sound pressure signals of microphone by an acoustic analysis system made by Ono Sokki Co., Ltd. Difference in sound pressure level between the second resonance peak and the second antiresonance peak of the frequency response function thus obtained was measured. The smaller the numerical value, the more distinguished the vibration controllability.

TABLE 14

|  | Composition 24 | Composition 25 | Composition 26 | Composition 27 | Composition 28 (Comp. Ex.) | Composition 29 (Comp. Ex.) | Composition 30 (Comp. Ex.) |
|---|---|---|---|---|---|---|---|
| Block Copolymer 1 (Parts by weight) | 70 | 70 | 70 | 70 | | | |
| Copolymer 2 (Parts by weight) | 30 | 30 | 30 | 30 | 100 | 100 | 100 |
| Styrene-based elastomer ① (Parts by weight) | 20 | 40 | 60 | | | 20 | |
| Styrene-based elastomer ② (Parts by weight) | | | | 40 | | | 20 |
| Crystallization time (sec) | 25 | 21 | 21 | 23 | 135 | 139 | 142 |
| Gear (I) | | | | | | | |
| Roundness (μm) | 24 | 26 | 28 | 26 | 34 | 41 | 40 |
| Dimensional stability (μm) | 34 | 31 | 30 | 32 | 47 | 42 | 43 |

TABLE 14-continued

|  | Composition 24 | Composition 25 | Composition 26 | Composition 27 | Composition 28 (Comp. Ex.) | Composition 29 (Comp. Ex.) | Composition 30 (Comp. Ex.) |
|---|---|---|---|---|---|---|---|
| Durability (mg) | 51 | 55 | 58 | 54 | Gear teeth broken | Gear teeth broken | Gear teeth broken |
| Gear (II) |  |  |  |  |  |  |  |
| Roundness (μm) | 23 | 24 | 27 | 25 | 33 | 40 | 39 |
| Dimensional stability (μm) | 48 | 46 | 45 | 47 | 75 | 76 | 77 |
| Durability (mg) | 48 | 51 | 56 | 53 | Gear teeth broken | Gear teeth broken | Gear teeth broken |
| SFD peelability | ◎ | ◎ | ◎ | ◎ | ◯ | XX | XX |
| Hammer hitting noise (dB) | 27 | 22 | 15 | 35 | 91 | 40 | 56 |

Styrene-based elastomer ①: styrene-vinylpolyisoprene-styrene copolymer (trademark "HYBRAR-VS-1", made by Kuraray Co., Ltd.; vinyl bond content = 70%; tan δ peak temperature = 20° C.)
Styrene-based elastomer ②: styrene-hydrogenated vinylpolyisoprene-styrene copolymer (trademark "HYBRAR-HVS-3", made by Kuraray Co., Ltd.; vinyl bond content = 55%; tan δ peak temperature = =5° C.)

Compositions 31–37

Block copolymer 1, Copolymer 2 and an inorganic filler were mixed together in formulations of Table 15 and melt kneaded, thereby preparing polyacetal resin compositions (Compositions 31–37), and physical properties of gears molded from the compositions were determined. The results are shown in Table 15.

Anti-SUS gear durability was determined by the same test as Durability Test given in the aforementioned item 7, except that a gear made from SUS 304 in the same shape as that of gear (I) was used as a driving gear, and weight loss (mg) of driven gear (I) was defined as a wear amount. The smaller the numerical value, the more distinguished the durability against the metal gear.

TABLE 15

|  | Composition 31 | Composition 32 | Composition 33 | Composition 34 | Composition 35 (Comp. Ex.) | Composition 36 (Comp. Ex.) | Composition 37 (Comp. Ex.) |
|---|---|---|---|---|---|---|---|
| Block Copolymer 1 (Parts by weight) | 70 | 70 | 70 | 70 |  |  |  |
| Copolymer 2 (Parts by weight) | 30 | 30 | 30 | 30 | 100 | 100 | 100 |
| Inorganic filler ① (Parts by weight) | 35 |  |  |  | 35 |  |  |
| Inorganic filler ② (Parts by weight) |  | 35 |  |  |  | 35 |  |
| Inorganic filler ③ (Parts by weight) |  |  | 35 | 35 |  |  | 35 |
| Maleic anhydride-modified α-olefin copolymer ① (Parts by weight) |  |  |  | 5 |  |  |  |
| Crystallization time (sec) | 26 | 28 | 31 | 25 | 105 | 108 | 112 |
| Gear (I) |  |  |  |  |  |  |  |
| Roundness (μm) | 26 | 28 | 27 | 28 | 40 | 41 | 41 |
| Dimensional stability (μm) | 31 | 32 | 31 | 30 | 47 | 42 | 43 |
| Durability (mg) | 79 | 78 | 72 | 64 | Gear teeth broken | Gear teeth broken | Gear teeth broken |
| Gear (II) |  |  |  |  |  |  |  |
| Roundness (μm) | 24 | 26 | 25 | 25 | 39 | 40 | 40 |
| Dimensional stability (μm) | 45 | 47 | 45 | 44 | 75 | 72 | 74 |
| Durability (mg) | 75 | 73 | 70 | 60 | 180 | 170 | 175 |

TABLE 15-continued

|  | Composition 31 | Composition 32 | Composition 33 | Composition 34 | Composition 35 (Comp. Ex.) | Composition 36 (Comp. Ex.) | Composition 37 (Comp. Ex.) |
|---|---|---|---|---|---|---|---|
| Gear (I) | | | | | | | |
| Anti-SUS gear durability (mg) | 36 | 35 | 30 | 25 | Gear teeth broken | Gear teeth broken | Gear teeth broken |

Inorganic filler ①: Talc (average particle size: 6 μm; granular state with an aspect ratio of 5)
Inorganic filler ②: Wollastonite (glass chop stand: non filament diameter 13 μm, length 3 mm, urethane-bundled; aminosilane-treated)
Maleic anhydride-modified α-olefin copolymer ①: ethylene (80 mol. %) - 1, butene (20 mol. %)

Compositions 38–42

Block Copolymer 1, Copolymer, liquid ethylene (70 mol %)-butene-1 (30 mol %) random copolymer obtained by polymerization in the presence of Ziegler catalyst (Mn=7730; Mw/Mn=1.9; given in Table 16 as "Liquid Random Copolymer 3"), difatty acid calcium and ethylene glycol difatty acid ester were mixed together in formulations of Table 16 and melt kneaded, thereby preparing polyacetal resin compositions (Compositions 38–42), and physical properties of gears molded from the compositions were determined. The results are shown in Table 16.

TABLE 16

|  | Composition 38 | Composition 39 | Composition 40 | Composition 41 | Composition 42 |
|---|---|---|---|---|---|
| Block Copolymer 1 (Parts by weight) | 70 | 70 | 70 | 70 | 70 |
| Copolymer 2 (Parts by weight) | 30 | 30 | 30 | 30 | 30 |
| Liquid Random Copolymer 3 (Parts by weight) | 3 | 3 | 3 | 3 | 3 |
| Calcium distearate (Parts by weight) |  | 0.02 | 0.02 | 0.04 | 0.04 |
| Calcium dibehenate (Parts by weight) |  | 0.02 | 0.02 |  |  |
| Ethylene glycol distearate (Parts by weight) |  |  | 0.03 | 0.06 |  |
| Ethylene glycol dipalmitate (Parts by weight) |  |  | 0.03 |  |  |
| Crystallization time (sec) | 20 | 20 | 20 | 20 | 20 |
| Gear (I) | | | | | |
| Roundness (μm) | 23 | 20 | 18 | 23 | 23 |
| Dimensional stability (μm) | 29 | 25 | 22 | 29 | 29 |
| Durability (mg) | 32 | 30 | 27 | 32 | 32 |
| Gear (II) | | | | | |
| Roundness (μm) | 18 | 16 | 14 | 18 | 18 |
| Dimensional stability (μm) | 42 | 38 | 35 | 42 | 42 |
| Durability (mg) | 32 | 30 | 25 | 33 | 33 |
| SFD peelability | ⊚ | ⊚ | ⊚ | ⊚ | ⊚ |

INDUSTRIAL APPLICABILITY

The present polyacetal ABA type block copolymer having a hydrogenated polybutadiene block hydroxyalkylated at both ends as Segment B and the specific polyacetal resin composition comprising the block copolymer have a short crystallization time even without addition a crystal nucleating agent, and can satisfy 4 characteristics necessary for materials for large-diameter gears, i.e. (1) high cycle capability (high productivity), (2) high roundness, (3) distinguished dimensional stability and (4) distinguished durability at the same time. Furthermore, the present polyacetal ABA type block copolymer and the specific polyacetal resin composition comprising the block copolymer have distinguished compatibility with other polymer compounds and adhesibility to inorganic fillers and show no peeling phenomena on the surfaces of molding when molded, and distinguished gear performances. Thus, the present polyacetal ABA type block copolymers or the specific polyacetal resin composition comprising the block copolymer provide very useful materials for large-diameter gears having a pitch circle diameter of 60 mm or more.

What is claimed is:

1. An ABA block copolymer, which comprises polyacetal segments (A) and a segment (B) which is derived from a hydrogenated polybutadiene (B') hydroxyalkylated at both ends, said block copolymer being represented by the following formula (1):

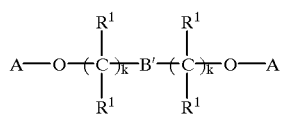

(1)

where A comprises 95–99.9 mol. % of oxymethylene units and 0.1–5 mol. % of oxyalkylene units represented by the following formula (2):

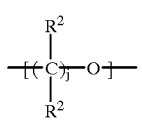

(2)

where R2 is independently selected from the group consisting of hydrogen, an alkyl group, a substituted alkyl group, an aryl group and a substituted aryl group, and j is an integer selected from 2 to 6, and the terminal groups are polyacetal copolymer residues having a structure represented by the following formula (3):

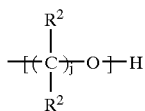

(3)

where $R^2$ and j have the same meanings as defined above, B' is a hydrogenated polybutadiene having an iodine value of 20 g-$I_2$/100 g or less and containing 70–98 mol. % of 1,2-bonds and 2–30 mol. % of 1,4-bonds, $R^1$ is independently selected from the group consisting of hydrogen, an alkyl group, a substituted alkyl group, an aryl group and a substituted aryl group, and k is an integer selected from 2 to 6 where two ks may be the same or different from each other, the hydrogenated polybutadiene segment hydroxyalkylated at both ends (B) having a number average molecular weight of 500–10,000 and the ABA block copolymer having a number average molecular weight of 10,000–500,000.

2. An ABA block copolymer according to claim 1, wherein B' is a hydrogenated polybutadiene containing 80–95 mol. % of 1,2-bonds and 5–20 mol. % of 1,4-bonds.

3. A polyacetal resin composition, which comprises 100 parts by weight of a polymer compound (I) comprising 20–100 wt. % of the ABA block copolymer according to claim 1 and 0–80 wt. % of a polyacetal copolymer having a number average molecular weight of 10,000–500,000, represented by the following formula (4):

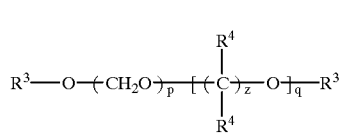

(4)

where $R^3$ and $R^4$ are independently selected from the group consisting of hydrogen, an alkyl group, a substituted alkyl group, an aryl group and a substituted aryl group, p=95–99.9 mol. %, q=0.1–5 mol. %, p+q=100 mol. %, and z is an integer selected from 2 to 6; and 0.1 to 200 parts by weight of at least one of polymer compounds (II) having a number average molecular weight of 500 or more, and selected from the group consisting of a polyolefin-based polymer compound, a polyurethane-based polymer compound, a polyester-based polymer compound, a polystyrene-based polymer compound, a polyacryl-based polymer compound and a polyamide-based polymer compound.

4. The polyacetal resin composition according to claim 3, wherein the polymer compound (II) is a polyolefin-based polymer compound comprising α-olefin-based-polymer compound.

5. A polyacetal resin composition according to claim 4, wherein the α-olefin-based polymer compound comprises 0.1 to 6 parts by weight of an ethylene-α-olefin random copolymer having a number average molecular weight of 500–10,000, comprising 10–70 mol. % of ethylene units and 30–90 mol. % of α-olefin units.

6. The polyacetal resin composition according to claim 4, wherein the α-olefin-based polymer compound is an α-olefin-based copolymer modified by an unsaturated carboxylic acid or its acid anhydride.

7. The polyacetal resin composition according to claim 3, wherein the polymer compound (II) is a polystyrene-based polymer compound comprising a copolymer of an aromatic vinyl monomer and a copolymerizable unsaturated monomer that can be copolymerized with the aromatic vinyl monomer.

8. The polyacetal resin composition according to claim 3, wherein the polymer compound (II) is a polystyrene-based polymer compound comprising a block (a) comprising a styrene monomer and a block (b) comprising isoprene or isoprene-butadiene and containing 20 mol. % or more of vinyl bonds.

9. A polyacetal resin composition, which comprises 100 parts by weight of the polymer compound (I) set forth in claim 3 and 0.1 to 100 parts by weight of an inorganic filler.

10. A polyacetal resin composition, which comprises 100 parts by weight of polymer compound (I) set forth in claim 3, 1 to 20 parts by weight of the polymer compound (II) set forth in claim 3 and 0.1 to 100 parts by weight of an inorganic filler.

11. The polyacetal resin composition, according to claim 3, further comprises 0.01 to 0.2 parts by weight of at least two of difatty acid calciums having 12–22 carbon atoms.

12. A molding comprising an ABA block copolymer according to claim 1.

13. The molding according to claim 12, wherein the molding is a large-diameter gear having a pitch circle diameter of 60 mm or more.

14. The molding according to claim 12, wherein the molding is a large-diameter gear having a pitch circle diameter of 100 mm or more.

15. The polyacetal resin composition according to claim 3, further comprising 0.01 to 0.9 parts by weight of at least two of esters of a fatty acid having 12–22 carbon atoms with ethylene glycol.

16. A molding comprising a resin composition according to claim 3.

17. The molding according to claim 16, wherein the molding is a large-diameter gear having a pitch circle diameter of 60 nm or more.

18. The molding according to claim 16, wherein the molding is a large-diameter gear having a pitch circle diameter of 100 nm or more.

19. The polyacetal resin composition according to claim 3, further comprising 0.01 to 0.2 parts by weight of at least two of difatty acid calciums having 12–22 carbon atoms and 0.01 to 0.9 parts by weight of at least two of esters of a fatty acid having 12–22 carbon atoms with ethylene glycol.

* * * * *

UNITED STATES PATENT AND TRADEMARK OFFICE
CERTIFICATE OF CORRECTION

PATENT NO.     : 6,777,487 B2                                              Page 1 of 1
DATED          : August 17, 2004
INVENTOR(S)    : Masahiko Niino et al.

It is certified that error appears in the above-identified patent and that said Letters Patent is hereby corrected as shown below:

<u>Title page,</u>
Insert Item:

-- [63]   Related U.S. Application Data

Continuaton of application no. PCT/JP00/05019    July 27, 2000 --

Signed and Sealed this

Seventh Day of December, 2004

JON W. DUDAS
*Director of the United States Patent and Trademark Office*